(12) United States Patent
Kano et al.

(10) Patent No.: US 7,614,466 B2
(45) Date of Patent: *Nov. 10, 2009

(54) HYBRID DRIVE SYSTEM

(75) Inventors: Seigo Kano, Anjo (JP); Satoru Wakuta, Anjo (JP); Kazuhisa Ozaki, Anjo (JP); Toshiharu Ikeda, Anjo (JP); Atsushi Ishibashi, Anjo (JP); Masahiro Kojima, Toyota (JP); Masatoshi Adachi, Toyota (JP)

(73) Assignees: Toyota Jidosha Kabushiki Kaisha, Toyota (JP); Aisin AW Co., Ltd, Anjo (JP)

( * ) Notice: Subject to any disclaimer, the term of this patent is extended or adjusted under 35 U.S.C. 154(b) by 454 days.

This patent is subject to a terminal disclaimer.

(21) Appl. No.: 11/249,322

(22) Filed: Oct. 14, 2005

(65) Prior Publication Data

US 2006/0081404 A1 Apr. 20, 2006

(30) Foreign Application Priority Data

Oct. 14, 2004 (JP) .............................. 2004-300802

(51) Int. Cl.
*B60L 11/00* (2006.01)

(52) U.S. Cl. .............................. 180/65.22; 180/65.225; 180/65.25; 903/951; 903/952

(58) Field of Classification Search ................. 180/292, 180/65.2, 65.3, 65.4, 65.6; 903/951, 952
See application file for complete search history.

(56) References Cited

U.S. PATENT DOCUMENTS

| | | | | | |
|---|---|---|---|---|---|
| 5,904,631 | A | * | 5/1999 | Morisawa et al. ............... | 475/5 |
| RE36,678 | E | * | 5/2000 | Moroto et al. ............. | 180/65.4 |
| 6,155,364 | A | * | 12/2000 | Nagano et al. ............. | 180/65.2 |
| 6,258,001 | B1 | * | 7/2001 | Wakuta et al. ................. | 475/5 |
| 6,455,947 | B1 | * | 9/2002 | Lilley et al. ............... | 290/40 C |
| 6,492,742 | B1 | * | 12/2002 | Fujikawa et al. .......... | 290/40 C |
| 6,695,082 | B2 | * | 2/2004 | Bitsche et al. ............. | 180/65.2 |
| 6,777,837 | B2 | * | 8/2004 | Tsuzuki et al. ............ | 310/67 R |
| 6,852,053 | B2 | * | 2/2005 | Nakano et al. .................. | 475/5 |
| 6,862,887 | B2 | * | 3/2005 | Noreikat et al. ............... | 60/716 |
| 6,863,140 | B2 | * | 3/2005 | Noreikat et al. ............ | 180/65.2 |
| 6,880,664 | B2 | * | 4/2005 | Pecnik et al. ............... | 180/243 |
| 7,255,186 | B2 | * | 8/2007 | Wakuta et al. ............. | 180/65.2 |
| 7,284,313 | B2 | * | 10/2007 | Raszkowski et al. .......... | 29/596 |
| 7,353,895 | B2 | * | 4/2008 | Bitsche et al. ............. | 180/65.2 |
| 7,393,296 | B2 | * | 7/2008 | Kano et al. ..................... | 475/5 |
| 7,426,971 | B2 | * | 9/2008 | Kano et al. ................. | 180/65.2 |

(Continued)

FOREIGN PATENT DOCUMENTS

EP 1 386 771 A2 2/2004

(Continued)

*Primary Examiner*—Jeffrey J Restifo
(74) *Attorney, Agent, or Firm*—Oliff & Berridge, PLC

(57) ABSTRACT

A front end portion of an output shaft is supported by a bearing mounted to an inner peripheral surface of a partition that separates a power distributing planetary gear and a speed change unit. A rear end portion of the output shaft is supported via a bearing which is interposed along a portion of the same plane along which also lies a mounting surface of a bearing in a rear wall that supports a rear end portion of a rotor of a second motor. As a result, the output shaft is supported by a twin support structure via the bearings by the partition and the rear wall.

20 Claims, 12 Drawing Sheets

U.S. PATENT DOCUMENTS

| | | |
|---|---|---|
| 2003/0102174 A1* | 6/2003 | Bordini .................. 180/65.2 |
| 2004/0077448 A1* | 4/2004 | Oshidari et al. ............ 475/5 |
| 2004/0084233 A1 | 5/2004 | Wakuta et al. |
| 2005/0037883 A1* | 2/2005 | Motoike et al. ............ 475/5 |
| 2005/0150700 A1* | 7/2005 | Bordini .................. 180/65.2 |
| 2006/0108162 A1* | 5/2006 | Tabata et al. ............. 180/65.2 |
| 2006/0169502 A1 | 8/2006 | Kano et al. |

FOREIGN PATENT DOCUMENTS

| | | |
|---|---|---|
| EP | 1 640 202 A1 | 3/2006 |
| EP | 1 657 094 A1 | 5/2006 |
| JP | A 2002-225578 | 8/2002 |
| JP | A 2004-066898 | 3/2004 |
| WO | WO-2005/000618 A1 | 1/2005 |

\* cited by examiner

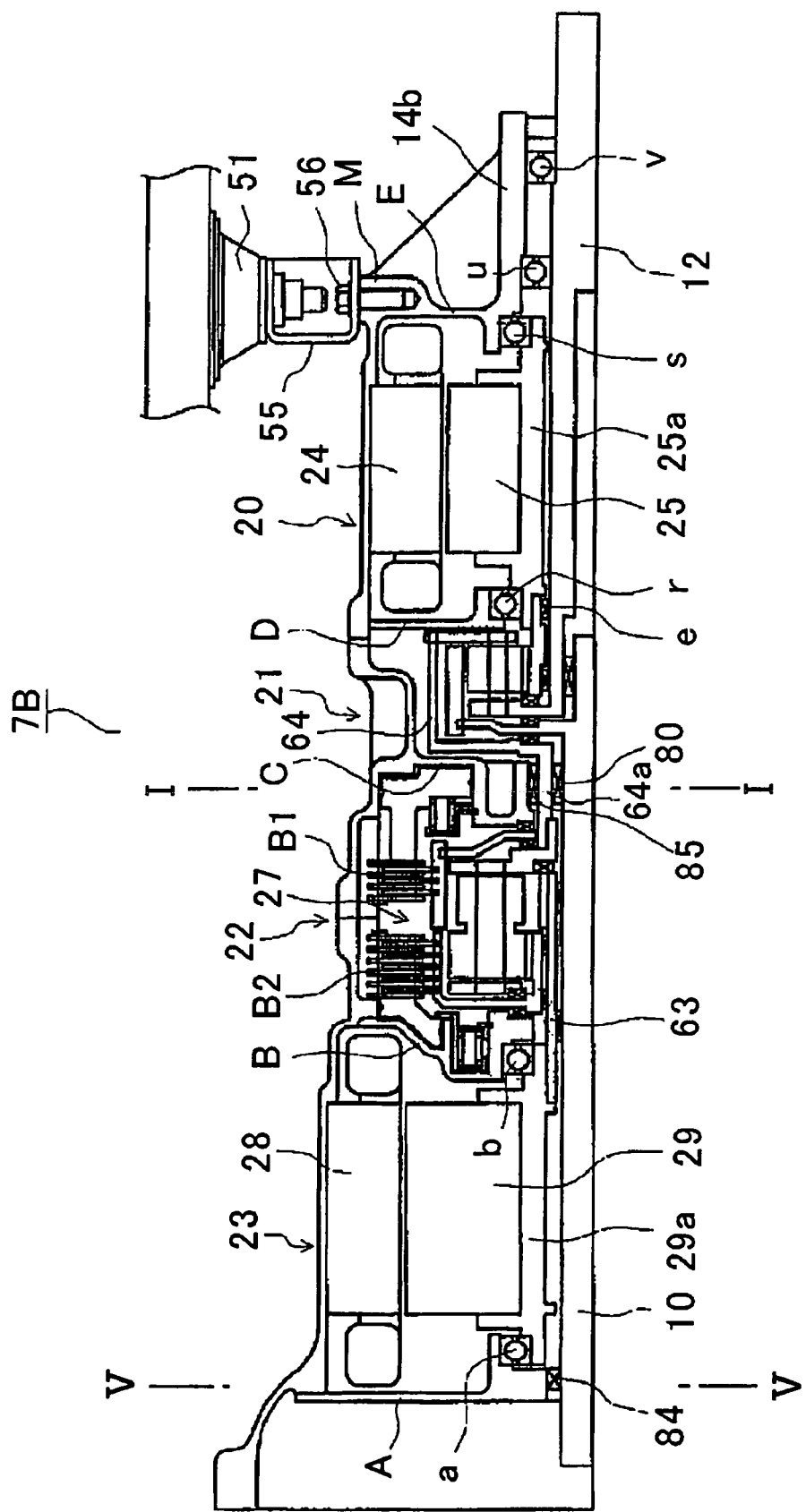

HYBRID DRIVE SYSTEM

This application claims priority from JP 2004-300802, filed Oct. 14, 2004, the entire disclosure of which is incorporated herein by reference thereto.

BACKGROUND

The disclosure relates to a hybrid drive system mounted in a vehicle, and a vehicle in which the hybrid drive system is mounted. More particularly, the disclosure relates to a hybrid drive system which is suitable to be applied to a front engine, rear drive (FR) vehicle and in which an input shaft and an output shaft are arranged on a single axis.

One type of known hybrid drive system is a so-called mechanical distribution type (i.e., a split type or 2-way type) hybrid drive system. This type of hybrid drive system uses a planetary gear that connects together an engine output shaft, a control generator (i.e., a first electric motor), and an output portion that transmits power to the vehicle wheels. Further, a drive (assist) motor (i.e., a second electric motor) is also connected to the output shaft. Output from the engine is shifted steplessly and output to the output portion from the planetary gear by controlling the generator. Moreover, the drive motor provides appropriate assist and outputs power from the output portion to an output shaft.

Japanese Patent Application Laid Open No. 2004-66898 and Japanese Patent Application Laid Open No. 2002-225578, for example, disclose a hybrid drive system in which a speed change unit is interposed between the drive motor and the output shaft.

SUMMARY

The hybrid drive system mounted in a FR vehicle has a long structure in the longitudinal direction because the input shaft and the output shaft are aligned with the engine output shaft on a single axis. Because the hybrid drive system is adjacent to the vehicle cabin, and particularly because many FR type vehicles are luxury vehicles, there is a great desire to reduce vibrations.

Therefore, of the various elements, i.e., the control generator (i.e., the first electric motor), the power distributing planetary gear, the speed change unit, and the drive motor (i.e., the second electric motor), it is preferable to both arrange the drive motor (i.e., the second electric motor) or the control generator (i.e., the first electric motor), which are heavy loads, at the rearmost end side (i.e., the side opposite the engine) of the transmission case, and use rubber mounts to support the rear end portion of the case on the vehicle body in order to reduce vibrations. Further, to improve quietness in the vehicle cabin, it is also preferable that an electric motor, which does not generate much noise, be arranged adjacent to the vehicle cabin.

With this arrangement, the power distributing planetary gear and the speed change unit are both arranged between the first and second electric motors. In the first and second electric motors, the gap between the stator and rotor is preferably precisely controlled to a small amount in order to improve performance. This gap can be kept very small by supporting the rotors of the electric motors by a twin support structure such that both end portions of the rotors are supported via a bearing member at a support portion (partition) which is integrated with a case member.

Meanwhile, the precision with which the input shaft and output shaft are supported affects both the performance of the hybrid drive system, as well as vibrations and quietness within the cabin. It is also preferable that both the input shaft and the output shaft be supported by twin support structures, such that both end portions of the both shafts are supported via bearings members by the support portion parts that support the rotors of the electric motors. However, in view of the fact that the power distributing planetary gear and the speed change unit are positioned in the middle on the single axis, as described above, one of either the input shaft or the output shaft ends up being bearing-supported via the other supported shaft at a location away from the support portion of the rotor in the axial direction.

Therefore, the clearance and tolerance of the input shaft or the output shaft, whichever is bearing-supported via the other shaft, accumulate, making it difficult to support the shaft with sufficient precision. In addition, because the shaft is bearing-supported at a location away from, in the axial direction, the support portion of the case member, not only is not possible to obtain sufficient support rigidity, but sufficient performance of the bearing member at that portion is unable to be obtained.

The disclosed exemplary embodiments aim to provide a hybrid drive system which solves the foregoing problems by providing a partition between the power distributing planetary gear and the speed change unit, and supporting either the input shaft or the output shaft, via a bearing member, by that partition.

According to one aspect, the power distributing planetary gear and the speed change unit are arranged adjacent to one another. Further, a partition is provided in between the power distributing planetary gear and the speed change unit such that the power distributing planetary gear and the speed change unit are each housed in spaces which are separated by the partition. As a result, both the planetary gear and the speed change unit can be easily and reliably supported. Further, the input shaft or the output shaft is supported via a twin support structure with a bearing member interposed at a support portion of the rotor and the partition. Therefore, the precision with which the input shaft or output shaft is supported is improved and the performance of the first and second electric motors is improved due to the fact that the rotors and stators of these electric motors are supported by the case member, which together result in improved vibration resistance and quietness. As a result, performance and reliability of the hybrid drive system can be improved.

BRIEF DESCRIPTION OF THE DRAWINGS

The description is made with reference the drawings in which:

FIG. 12 is a longitudinal sectional view showing the second exemplary embodiment in which a portion of an output shaft support has been modified.

DETAILED DESCRIPTION OF EMBODIMENTS

Figure 1:
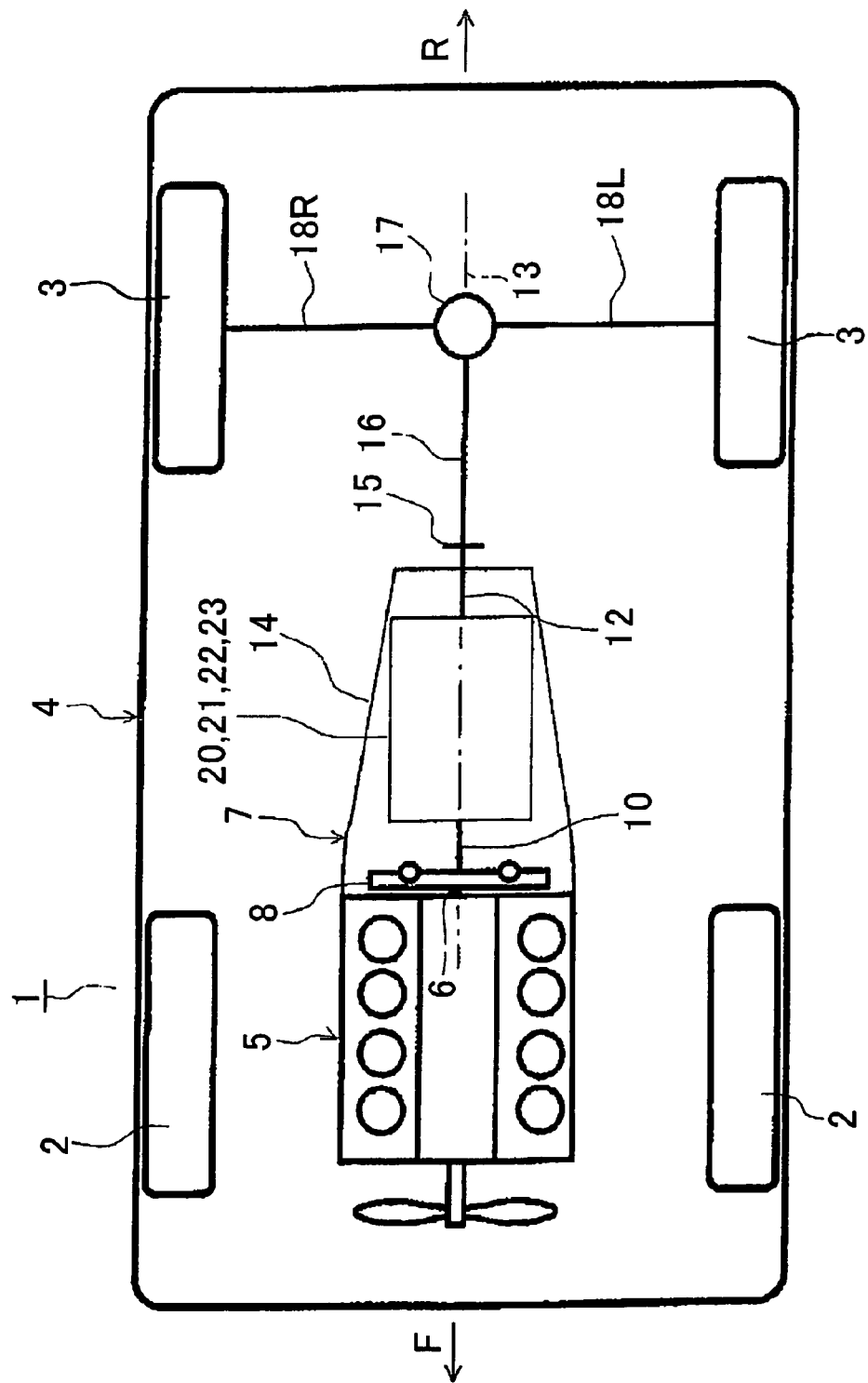
FIG. 1 is a representational plan view of a vehicle in which a hybrid drive system has been mounted.

Exemplary embodiments will hereinafter be described with reference to the appended drawings. In the drawings, parts denoted by the same reference characters are alike in structure and operation, so redundant descriptions of those parts will accordingly be omitted unless necessary to ease understanding of the description.

FIG. 1 shows an example of a vehicle, i.e., a vehicle 1, in which a hybrid drive system has been mounted. The vehicle 1 in the drawing is a front engine, rear drive (FR) type vehicle. The drawing is a plan view that shows a representation of the general structure of the vehicle. In the drawing, the arrow F points toward the front and the arrow R points toward the rear of the vehicle.

The vehicle 1, shown in the drawing, has a vehicle body 4 that is supported by left and right rear wheels 3, 3, which serve as the driven wheels, and left and right front wheels 2, 2. An internal combustion engine 5 is mounted to the front portion of the vehicle body 4 via a rubber mount (not shown) in such a way that a crankshaft 6 of the internal combustion engine 5 extends in the longitudinal direction. In the drawing, an output shaft, i.e., the rearward protruding portion of the crankshaft, is shown as the crankshaft 6. A hybrid drive system 7 is connected to the rear end of the internal combustion engine 5.

The hybrid drive system 7 includes an input shaft 10 which is connected to the crankshaft 6 of the internal combustion engine 5 via a damper device 8, a first electric motor 20, a power distributing planetary gear 21, a speed change unit 22, a second electric motor (see FIG. 2), and an output shaft 12 which outputs driving force. Here, the input shaft 10 and the output shaft 12 are both arranged on a single axis 13, with the input shaft 10 being arranged on the front side and the output shaft 12 being arranged on the rear side. The input shaft 10 and output shaft 12 are both arranged pointing in the longitudinal direction of the vehicle body 4. The first electric motor 20, the power distributing planetary gear 21, the speed change unit 22, and the second electric motor 23 are all housed in a case member 14 which extends in the longitudinal direction. The hybrid drive system 7 will be described in detail later.

The output shaft 12 of the hybrid drive system 7 protrudes from the rear end of the case member 14 and extends farther to the rear where it is connected to a differential mechanism 17 via a flexible coupling 15 and a known propeller shaft 16 (which actually has a universal joint and a center bearing and the like, which are not shown). Moreover, the differential mechanism 17 is connected to the left and right rear wheels 3, 3 via a left drive axle 18L and a right drive axle 18R.

In the vehicle 1 having the foregoing structure, power generated by the internal combustion engine 5 is input to the input shaft 10 of the hybrid drive system 7 and adjusted by the first electric motor 20, the power distributing planetary gear 21, the speed change unit 22, and the second electric motor 23, which will be described later, after which it is output from the output shaft 12. The adjusted power is then transmitted to the left and right rear wheels 3, 3, i.e., the driven wheels, via the propeller shaft 16 and the like.

Next, a hybrid drive system 7A, according to this exemplary embodiment, will be described as one example of the hybrid drive system 7 which is mounted to the vehicle 1 shown in FIG. 1. First, an outline of the overall hybrid drive system 7A will be described with reference to the schematic view of FIG. 2. Then the detailed structure will be described with reference to FIG. 3. In these drawings, the arrow F points toward the front of the vehicle body (i.e., the internal combustion engine 5 side) and the arrow R points toward the rear of the vehicle body (i.e., the differential mechanism 17 side).

Figure 2:
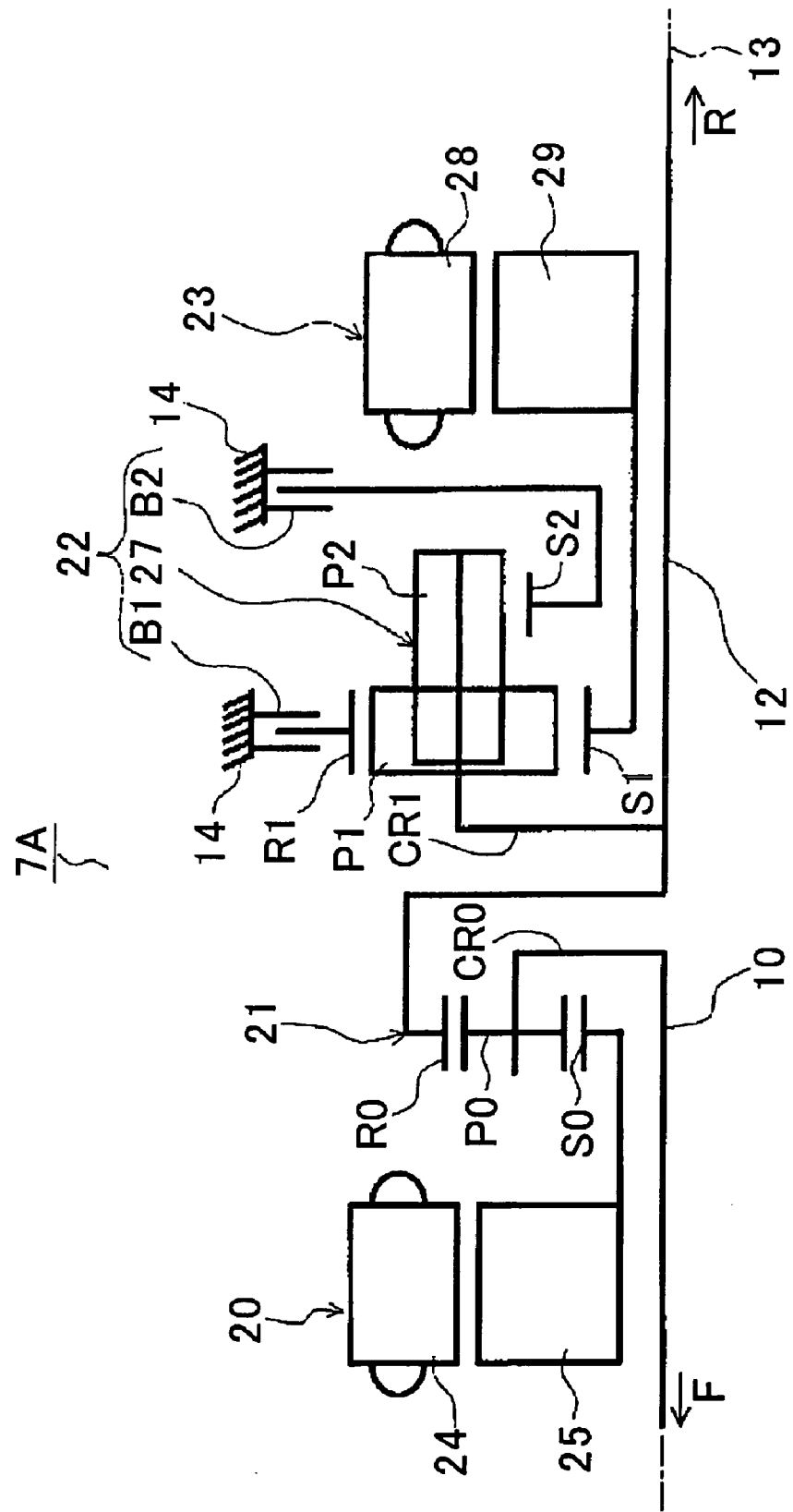
FIG. 2 is a schematic view of a hybrid drive system according to a first exemplary embodiment.

As shown in FIG. 2, the hybrid drive system 7A includes, in order from the side nearest the internal combustion engine 5 in FIG. 1, i.e., in order from the front to the rear, a first electric motor 20, a power distributing planetary gear 21, a speed change unit 22, and a second electric motor 23, all of which are housed in a case member 14 (see FIG. 1) and aligned around a single axis 13. Hereinafter, the foregoing components of the hybrid drive system 7A will be described in order from the first electric motor 20 to the second electric motor 23.

The first electric motor 20 includes a stator 24 which is fixed to the case member (see FIG. 1) 14, and a rotor 25 which is rotatably supported at an inner radial side (i.e., in the following description, regarding locations in the radial direction of the case member 14, the side near the single axis 13 will be referred to as the "inner radial side" and the side away from the single axis 13 will be referred to as the "outer radial side") of the stator 24. The rotor 25, of the first electric motor 20, is connected to a sun gear S0 of the power distributing planetary gear 21 which will be described next. This kind of first electric motor is mainly used to generate electricity based on power input via the sun gear S0, drive the second electric motor 23 via an inverter (not shown), and charge an HV battery (i.e., a battery for driving the hybrid; not shown).

The power distributing planetary gear 21 is a single pinion planetary gear that is arranged on the same axis as the input shaft 10. The power distributing planetary gear 21 includes a carrier (i.e., a first rotating element) CR0 which supports a plurality of pinions P0, and a sun gear (i.e., a second rotating element) S0 and a ring gear (i.e., a third rotating element) R0 which are both in mesh with the pinions P0. The carrier CR0 of the power distributing planetary gear 21 is connected to the input shaft 10, while the sun gear S0 is connected to the rotor 25 of the first electric motor 20, and the ring gear R0 is connected to an output shaft 12. This kind of power distributing planetary gear 21 distributes power input to the carrier CR0, via the input shaft 10, to the first electric motor 20 side, via the sun gear S0, to the output shaft 12 side, via the ring gear R0, based on the speed control of the first electric motor 20. The power distributed to the first electric motor 20 is used to generate electricity, and the power distributed to the output shaft 12 is used to drive the vehicle 1.

The speed change unit 22 has a so-called Ravigneaux type planetary gear unit 27, which includes a double pinion planetary gear and a single pinion planetary gear that has common pinions with the double pinion planetary gear. In addition, the speed change unit 22 also has a first brake B1 and a second brake B2.

The planetary gear unit 27 includes two sun gears S1, S2, a carrier CR1 which supports pinions P1 and pinions (common long pinions) P2, and a ring gear R1. Of the two pinions P1, P2, the pinions P1 are in mesh with the sun gear S1 and the ring gear R1, while the common long pinions P2 are in mesh with the sun gear S2 and the pinions P1. In the planetary gear unit 27, the ring gear R1 is connected to the first brake B1, while the sun gear S2 is connected to the second brake B2. In terms of the speed change unit 22 as a whole, the sun gear S1, which serves as the input member, is connected to a rotor 29 of the second electric motor 23, which will be described next, while the carrier CR1, which serves as the output member, is connected to the output shaft 12, just like the ring gear R0 of the power distributing planetary gear 21 described above. As will be described later, the speed change unit 22 can be switched between two reduced output speeds of different reduction gear ratios by applying either the first brake B1 or the second brake B2 and releasing the other, and conversely, releasing the one and applying the other. That is, the speed change unit 22 changes the amount of power input via the sun gear S1 from the second electric motor 23, which will be described next, and then transmits the resulting power to the output shaft 12 via the carrier CR1.

Of the first electric motor 20, the power distributing planetary gear 21, the speed change unit 22, and the second electric motor 23, the second electric motor 23 is arranged farthest toward the rear, i.e., in a location farthest from the internal combustion engine 5. The second electric motor 23 includes a stator 28 which is fixed to the case member (see FIG. 1) 14, and a rotor 29 which is rotatably supported at the inner radial side of the stator 28. The rotor 29 of the second electric motor 23 is connected to the sun gear S1 of the speed change unit 22 described above. The second electric motor 23 is connected to the. HV battery via an inverter, just like the first electric motor 20. The main function of the second electric motor 23, however, is different from that of the first electric motor 20. That is, while the first electric motor 20 is mainly used for generating electricity, the second electric motor 23, on the other hand, mainly functions as a drive motor to assist with powering (i.e., providing driving force to) the vehicle 1. During braking and the like, however, the second electric motor 23 functions as a generator and regenerates vehicle inertia force in the form of electric energy.

Here, of the first electric motor 20, the power distributing planetary gear 21, the speed change unit 22, and the second electric motor 23 described above, the first and second electric motors 20, 23 are so-called heavy loads which are heavy compared to the power distributing planetary gear 21 and the speed change unit 22. In this exemplary embodiment, the power distributing planetary gear 21 and the speed change unit 22 are arranged adjacent to one another, as shown in FIG. 2. Further, the power distributing planetary gear 21 and the speed change unit 22 are arranged between the first and second electric motors 20, 23. Therefore, the first and second electric motors 20, 23, which are the heavy loads, are arranged with one at the front of the case member 14 and the other at the rear of the case member 14. In particular, of the first electric motor 20, the power distributing planetary gear 21, the speed change unit 22, and the second electric motor 23, the second electric motor 23, which is the heaviest load, is arranged farthest to the rear, i.e., in a location that is the farthest away from the internal combustion engine 5.

Figure 3:
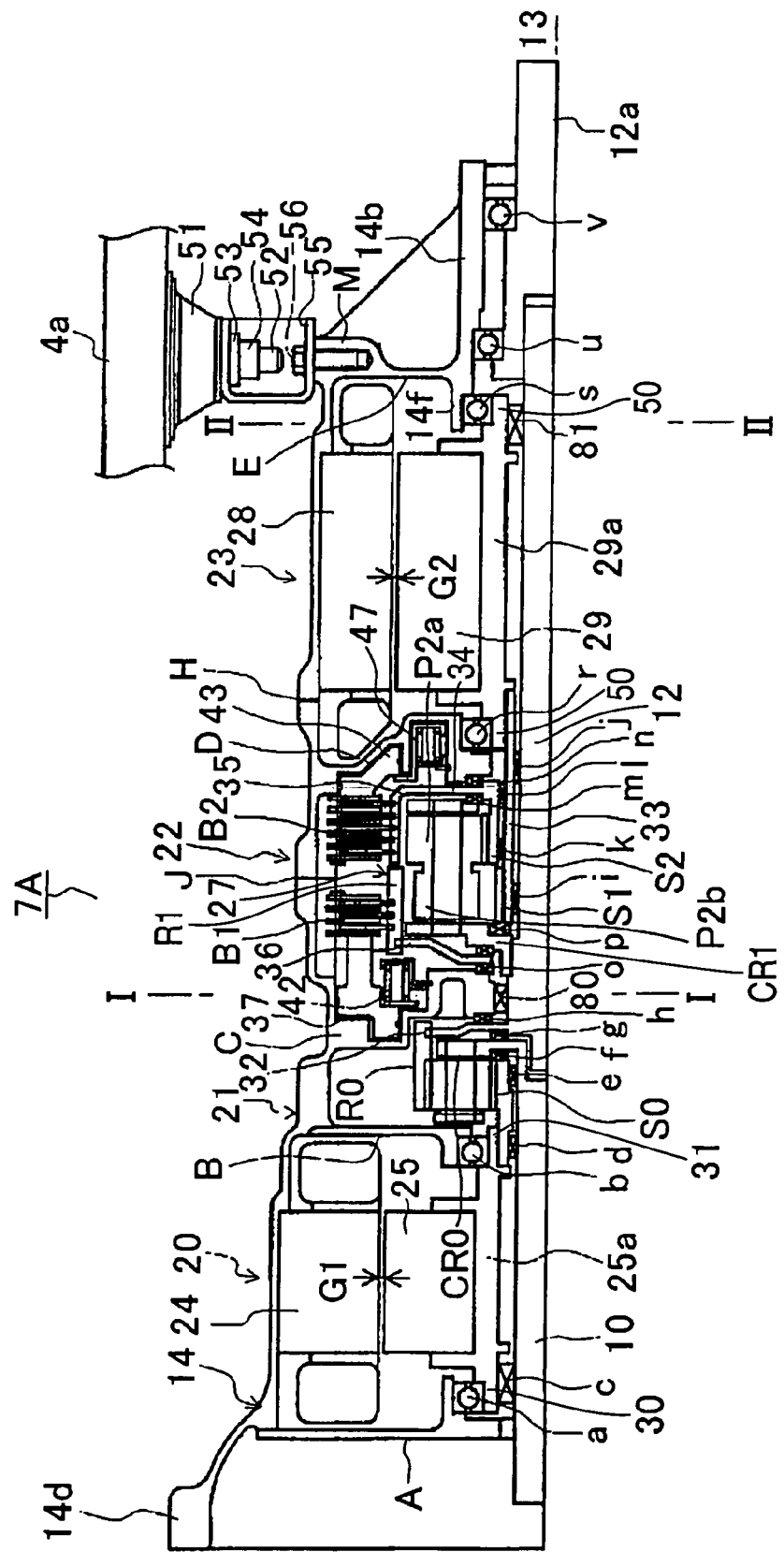
FIG. 3 is a longitudinal sectional view showing the structure of the hybrid drive system according to the first exemplary embodiment.

The operation and effects of the hybrid drive system 7A, described with reference to the schematic view in FIG. 2, will be described after the detailed structure of the hybrid drive system 7A is described with reference to FIG. 3. FIG. 3 shows half of a longitudinal cross-section that includes the single axis 13 of the hybrid drive system 7A.

The hybrid drive system 7A, shown in the drawing, includes the input shaft 10 and the output shaft 12, both of which are arranged on the single axis 13, and the first electric motor 20, the power distributing planetary gear 21, the speed change unit 22, and the second electric motor 23, all of which are arranged around the first axis 13 and housed in the case member 14 together with the input shaft 10 and the output shaft 12. A portion (extension shaft 12a) on the rear end side of the output shaft 12, however, protrudes to the rear from the case member 14.

In consideration of assembly and the like, the case member 14 is integrally constructed of a plurality of separate portions which are joined together at joint surfaces in the longitudinal direction along the single axis 13. For example, joint surface H is located near the front portion of the second electric motor 23, and joint surface J is located between the first and second brakes B1, B2 of the speed change unit 22. The specific location of the joint surface J is not limited as long as it is between an actuator 37 of the first brake B1 and an actuator 43 of the second brake B2. A plurality of partitions, i.e., partitions A, B, C, D, E, in order from the front, which act as support members, are formed in different locations in the longitudinal direction in the case member 14. Of the partitions A to E, the partition A is arranged near the front end of the case member 14 and partition E is arranged near the rear end of the case member 14. The space in the case between the partitions A, E is divided into four separate spaces in the longitudinal direction along the single axis 13 by the partitions B, C, D. In addition to serving as strengthening members of the case member 14, the partitions A to E also hold bearings (bearing members) (to be described later), and form hydraulic pressure chambers (actuators) 43, 37 (to be described later). The partition C supports the front end portion of the output shaft 12 (to be described later) and is integrally formed as a part of the case member 14. The partitions D, E support the rotor 29 of the second electric motor 23 and are also formed integrally with the case member 14. The partitions A, B are integrally fixed to the case member 14 by bolts. Accordingly, the dividing surfaces (i.e., joint surfaces) H, J of the case member 14 can be kept as small as possible while enabling assembly and increasing the support rigidity for the output shaft 12.

The first electric motor 20, the power distributing planetary gear 21, the speed change unit 22, and the second electric motor 23 described above are housed within the four spaces that are separated by the partitions A to E, respectively. That is, the first electric motor 20 is housed between the partitions A, B, the power distributing planetary gear 21 is housed between the partitions B, C, the speed change unit 22 is housed between the partitions C, D, and the second electric motor 23 is housed between the partitions D, E. Hereinafter, the foregoing components will be described in detail in order starting with the first electric motor 20.

The first electric motor 20 is, for example, a permanent magnet alternating current synchronous motor (a brushless DC motor), and is arranged on the outer radial side of, and on the same axis as, the input shaft 10. The first electric motor 20 has the stator 24 that is fixed to the inner peripheral surface of the case member 14, and the rotor 25 that is rotatably disposed across a predetermined air gap G1 on the inner radial side with respect to the stator 24. The inner radial side of the rotor 25 is a cylindrical rotor shaft (hereinafter referred to as a "boss portion" or "rotor boss portion") 25a. Step portions are formed on the outer peripheral surfaces of both a front portion and a rear portion of the boss portion 25a. The rotor 25 is rotatably supported by the case member 14 via bearings a, b which are fitted in a state positioned in the longitudinal direction between the partitions A, B and the step portions 30, 31 at the front end portion and rear end portion of the boss portion 25a. Also, a sun gear S0 of the power distributing planetary gear 21, to be described later, is fixed to the rear end of the boss portion 25a. The input shaft 10 is supported by the rotor 25 via bearings c, d which are provided in positions that overlap in the axial direction with the bearings a, b. The sun gear S0 is relatively rotatably supported by the input shaft 10 via bearings d, e which are fixed to the outer peripheral surface of the input shaft 10. The bearing d is arranged in a position which corresponds in the longitudinal direction to the bearing b. Also, the bearing e is arranged in a position which corresponds to the gear portion of the sun gear S0. Thus, the rotor 25 of the first electric motor 20 is rotatably supported by the case member 14 via the bearings a, b which are mounted to the partitions A, B, so the position of the rotor 25 in both the longitudinal direction as well as in the radial direction can be precisely maintained. As a result, the predetermined air gap G1 between the stator 24 and the rotor 25 can be precisely maintained even if force is applied to the case member 14 which causes it to flex in the vertical direction or in the lateral direction, for example. As described above, the first electric motor 20 is connected to the HV battery via the inverter. The main function of the first electric motor 20, having this kind of structure, is to generate electricity based on power distributed to the sun gear S0 of the power distributing planetary gear 21, which will be described next, to drive the second electric motor 23 via the inverter, and to charge the HV battery.

The front end portion of the input shaft 10 is supported by the partition A via the bearing a, the rotor boss portion 25a, and the bearing c, at a location where they all overlap in the axial direction, while the rear end portion of the input shaft 10 is supported by the partition B via the bearing b, the integrated rotor boss portion 25a and the sun gear S0, and the bearing d, at a location where they all overlap in the axial direction. Thus, the input shaft 10 is supported by a twin support structure via the bearings c, d by the partitions A, B which serve as support portions that are integrated with the case member 14. As a result, the input shaft 10 is supported indirectly (i.e., via the rotor boss portion 25a) by bearings c, d at support surfaces of the partitions A, B, thereby enabling the input shaft 10 to be supported with high precision.

Meanwhile, the front end portion of the output shaft 12 is directly supported by the partition C via a bearing 80, while the rear end portion of the output shaft 12 is supported by the rear wall partition E via a bearing s, a rotor boss portion 29a of the second electric motor 23, and a bearing 81. The bearing s which supports the rear end portion of the rotor boss portion 29a and the bearing 81 which supports the output shaft 12 are in positions that overlap in the axial direction. Accordingly, the output shaft 12 is supported by a twin support structure, with the front end portion of the output shaft 12 being directly supported via the bearing 80 by the partition C portion, i.e., by a portion along plane I-I on which the bearing 80 is mounted, while the rear end portion of the output shaft 12 is supported via the rotor boss portion 29a (i.e., indirectly) by the bearing 81 at a portion of the rear wall E along plane II-II on which the bearing s is mounted. As a result, the output shaft 12 can be supported with high precision regardless of its long structure. Also, the partition C and the bearing 80 are positioned so that they overlap with each other, as well as with the actuator 37 of the first brake B1, in the axial direction, thus enabling the hybrid drive system to be made more compact in the axial direction.

The extension shaft 12a is integrally fitted to the rear end portion of the output shaft 12 by splines or the like. The extension shaft 12a is rotatably supported via bearings u, v by a cylindrical portion 14b formed on the rear wall E of the case member 14. The cylindrical portion 14b and a bearing mounting surface 14f of the rear wall E are formed integrally with the case member 14 and are highly concentric. Therefore, the integrated output shaft 12 and the extension shaft 12a are precisely supported as a result of the high degree of concentricity.

The power distributing planetary gear 21 is arranged between the partitions B, C of the case member 14. As described above, the power distributing planetary gear 21 is a single pinion planetary gear that is arranged on the same axis as the input shaft 10 and includes the sun gear (i.e., the second rotating element) S0, the carrier (i.e., the first rotating element) CR0 which supports the pinions P0, and the ring gear (i.e., the third rotating element) R0. Of these, the sun gear S0 extends forward where it is fixed to the rear end side of the rotor 25 of the first electric motor 20. Also, the carrier CR0 is fixed to the rear end of the input shaft 10, i.e., the rear end of the input shaft 10 that extends between the partitions B, C. The carrier CR0 is rotatably supported by bearings f, g which are fitted to the front surface and rear surface, respectively, of the inner radial side of the carrier CR0. The bearing f is interposed between the front surface of the carrier CR0 and the rear end surface of the sun gear S0, and the bearing g is interposed between the rear surface of the carrier CR0 and a flange portion 32 that is fixed to the front end side of the output shaft 12. The pinions P0, supported by the carrier CR0, are in mesh with the sun gear S0 at the inner radial side and with the ring gear R0 at the outer radial side. The ring gear R0 extends toward the rear where it is fixed to the outer radial side of the flange portion 32 of the front end of the output shaft 12. The flange portion 32 is rotatably supported at its radial inner side front surface via the bearing g and at its inner radial side rear surface via a bearing h which is fixed to the inner radial side front surface of the partition C. Thus, in the power distribution planetary gear 21, the carrier CR0, which serves as the input portion, is fixed to the rear end of the input shaft 10, the sun gear S0, which serves as an output portion (i.e., a power distribution target), is connected to the rear end of the rotor 25 of the first electric motor 20, and the ring gear R0, which also serves as an output portion (i.e., a power distribution target), is connected to the front end of the output shaft 12. The power distributing planetary gear 21 distributes power from the internal combustion engine 5 (see FIG. 1) input to the carrier CR0, via the input shaft 10 to both the first electric motor 20 side, via the sun gear S0 and the output shaft 12 side, via the ring gear R0. The ratio of power distribution at this time is determined based on the operating state of the first electric motor 20. That is, when a large amount of power is generated by the rotor 25 of the first electric motor 20, the amount of electricity generated by the first electric motor 20 increases, and the power output to the output shaft 12 decreases proportionately. Conversely, when only a small amount of power is generated by the rotor 25 of the first electric motor 20, the amount of electricity generated by the first electric motor 20 decreases, and the power output to the output shaft 12 proportionately increases.

The speed change unit 22 is arranged between the partitions C, D of the case member 14, i.e., substantially in the middle in the longitudinal direction (i.e., in the direction along the single axis 13) of the case member 14. The speed change unit 22 includes the Ravigneaux type planetary gear unit 27 arranged at the inner radial side, and the first brake B1 and the second brake B2 arranged at the outer radial side, with the first brake B1 located toward the front side of the Ravigneaux type planetary gear unit 27 and the second brake B2 located toward the rear side of the Ravigneaux type planetary gear unit 27. The power distributing planetary gear 21 and the speed change unit 22 are separated by the partition C. The inner radial surface of the partition C serves as the mounting surface for the bearing 80 which rotatably supports the front end portion of the output shaft 12.

The planetary gear unit 27 includes a first sun gear S1 (hereinafter simply referred to as "sun gear S1") arranged near the outer peripheral surface at the front end side of the output shaft 12, a second sun gear S2 (hereinafter simply referred to as "sun gear S2") arranged farther toward the outer radial side than the sun gear S1 as well as to the rear of the sun gear S1, a ring gear R1 which is arranged on the outer radial side of the sun gear S1, pinions P1 which are in mesh with the sun gear S1 and the ring gear R1, common long pinions P2 which are in mesh with the sun gear S2 and the pinions P1, and a carrier CR1 which supports the pinions P1, P2 (see FIG. 2). These components will now be described in order starting with the sun gear S1.

The sun gear S1 is connected to the front end of the rotor 29 of the second electric motor 23, to be described later, via a sleeve 33 which is fit onto the outer peripheral surface of the front half portion of the output shaft 12. The sun gear S1 is relatively rotatably supported by the output shaft 12 via the sleeve 33 as well as via bearings i, j which are fitted to the outer peripheral surface of the output shaft 12.

The sun gear S2 is such that a flange portion, which extends from the rear end side of the sun gear S2 to the outer radial side along a rear side carrier plate of the carrier CR1, and a drum portion 35, which extends forward from the outer radial side end portion of a flange portion 34, are integrally formed. The second brake B2, to be described later, is interposed between the outer peripheral surface of the drum portion 35 and inner peripheral splines on the inner peripheral surface of the case member 14. The sun gear S2 is rotatably supported via bearings k, l fitted to the outer peripheral surface of the sleeve 33, which is integrated with the sun gear S1 as described above, as well as via bearings m, n fitted to the front surface and rear surface, respectively, at the inner radial side (i.e., the base end side) of the flange portion 34. The bearing m is interposed between the inner radial side front surface of the flange portion 34 and the inner radial side rear surface of the rear side carrier plate of the carrier CR1, to be described later. The bearing n is interposed between the inner radial side rear surface of the flange portion and the inner radial side front surface of the partition D.

The flange portion 36, which extends to the inner radial side along a front side carrier plate of the carrier CR1, is fixed to the front end portion of the ring gear R1 such that the ring gear R1 is rotatably supported by bearings o, p fitted to the front surface and the rear surface, respectively, at the inner radial side of the flange portion 36. The bearing o is interposed between the front surface at the inner radial side of the flange portion 36 and the inner radial side rear surface of the partition C. The bearing p is interposed between the rear surface of the flange portion 36 and the front side carrier plate of the carrier CR1. The first brake B1 is interposed between the outer peripheral surface of the ring gear R1 and inner peripheral splines on the inner peripheral surface of the case member 14.

The pinions P1 are rotatably supported by the carrier CR1, and are in mesh with the sun gear S1, at the inner radial side, as well as with the ring gear R1, at the outer radial side.

The pinions P2 are common long pinions which have a large diameter gear P2a formed on the rear side and a small diameter gear P2b formed on the front side. These gears P2a, P2b are integrally formed. The large diameter gear P2a of the pinions P2 is in mesh with the sun gear S2, and the small diameter gear P2b of the pinions P2 is in mesh with the pinions P1.

The carrier CR1 rotatably supports the pinions P1, P2 with the front side carrier plate and the rear side carrier plate. The front side carrier plate is fixed to the outer peripheral surface at the front end side of the output shaft 12. The carrier CR1 is relatively rotatably supported by the bearing p which is fitted to the front surface and the rear surface at the inner radial side of the front side carrier plate, as well as by a bearing m which is fitted to the inner radial side front surface of the rear side carrier plate.

The first brake B1 has multiple discs and friction plates (brake plates). Outer peripheral splines formed on the outer peripheral surface of the ring gear R1 are spline-engaged with the multiple discs or friction plates(brake plates) and the other of the multiple discs and friction plates are spline-engaged with inner peripheral splines formed on the inner peripheral surface of the case member 14. A first brake hydraulic actuator 37 is arranged at the front side of the first brake B1. The hydraulic actuator 37 includes a piston, a first hydraulic pressure chamber, and a return spring (i.e., a compression spring) 42. The piston is arranged so as to be able to move in the longitudinal direction at the front of the first brake B1. The first hydraulic pressure chamber is formed in the outer radial side rear surface of the partition C such that the front end side of the piston fits into the rear surface of the partition C with an oil tight fit. The return spring 42 is interposed between a retainer fixed to the partition C and the inner radial side rear surface of the piston, and urges the piston forward.

The second brake B2 is arranged adjacent to, and immediately behind, the first brake B1. The second brake B2 also has multiple discs and friction plates (brake plates). Outer peripheral splines formed on the outer peripheral surface of the drum portion 35, which is integrated with the sun gear S2 are spline-engaged with the multiple discs or friction plates and the other of the multiple discs or friction plates is spline-engaged with inner peripheral splines formed on the inner peripheral surface of the case member 14. A second brake hydraulic actuator 43 is arranged at the rear side of the second brake B2. The hydraulic actuator 43 includes a piston, a second hydraulic pressure chamber, and a return spring (i.e., a compression spring) 47. The piston is arranged so as to be able to move in the longitudinal direction at the rear of the second brake B2. The second hydraulic pressure chamber is formed in the outer radial side front surface of the partition D such that the rear end side of the piston fits into the front surface of the partition D with an oil tight fit. The return spring 47 is interposed between a retainer fixed to the partition D and the inner radial side front surface of the piston, and urges the piston toward the rear.

In the speed change unit 22 of the foregoing structure, output from the second electric motor 23 is transmitted to the sun gear S1 via the sleeve 33. In Lo speed, the first brake B1 is applied and the second brake B2 is released. Accordingly, the ring gear R1 is held and the sun gear S2 rotates freely. The rotation of the first sun gear S1 is greatly reduced in speed by the pinions P1 and transmitted to the carrier CR1. The rotation of the carrier CR1 is then transmitted to the output shaft 12.

When the speed change unit 22 is in Hi speed, the first brake B1 is released and the second brake B2 is applied. Accordingly, the sun gear S2 is held and the ring gear R1 rotates freely. In this state, the rotation of the sun gear S1 is transmitted to the pinions P1. Also, the pinions P2 are in mesh with the sun gear S2, which is held, so the carrier CR1 revolves at a controlled predetermined speed. At this time, the rotation of the carrier CR1, the speed of which has been reduced a relatively small amount, is transmitted to the output shaft 12.

Thus, when the speed change unit 22 is in Lo speed, the first brake B1 is applied and the second brake B2 is released such that rotation which has been greatly reduced in speed is transmitted to the output shaft 12. When the speed change unit 22 is in Hi speed, on the other hand, the first brake B1 is released and the second brake B2 is applied such that rotation in which the speed has been reduced a relatively small amount is transmitted to the output shaft 12. In this way, the speed change unit 22 can shift between two speeds, thus making it possible to make the second electric motor 23 compact. That is, using a small electric motor, it is possible, for example, to transmit sufficient drive torque to the output shaft 12 by using Lo speed during take-off of the vehicle 1, which requires a large amount of torque, and then shift to Hi speed when the output shaft 12 is rotated at high speed in order to keep the rotor 29 from rotating at high speed.

The second electric motor 23 is, for example, a permanent magnet alternating current synchronous motor (brushless DC motor), and is arranged at the outer radial side of the output shaft 12 on the same axis as the output shaft 12. The second electric motor 23 includes the stator 28 which is fixed to the inner peripheral surface of the case member 14 and the rotor 29 which is rotatably arranged across a predetermined air gap G2 at the inner radial side with respect to the stator 28. At the inner radial side of the rotor 29 is the cylindrical boss portion 29a. Stepped portions 50 are formed on both the outer peripheral surface of the front portion of the cylindrical boss portion 29a and the outer peripheral surface of the rear portion of the cylindrical boss portion 29a. The rotor 29 is rotatably supported by the case member 14 via bearings r, s fitted in positions in the longitudinal direction between the stepped portions 50 and the partitions D, E at the front end portion and rear end portion, respectively, of the rotor 29. Also, the sleeve 33, which is integrated with the sun gear S1 of the speed change unit 22 described above, is fixed to the front end of the boss portion 29a. In this way, the rotor 29 of the second electric motor 23 is rotatably supported by the case member 14 via the bearings r, s which are mounted to the partitions D, E, so the position of the rotor 29 in both the longitudinal direction as well as in the radial direction can be precisely maintained. As a result, the predetermined air gap G2 between the stator 28 and rotor 29 can be precisely maintained even if force is applied to the case member 14 which causes it to flex in the vertical direction or in the lateral direction, for example. As described above, the second electric motor 23 is connected to the HV battery via the inverter, just as is the first electric motor 20.

Also, in the case member 14, the outer peripheral side of the partition E is thickly formed and serves as a mounting portion M. The case member 14 is connected at a connecting portion 14d, which is on the front end side of the case member 14, to the internal combustion engine 5, which is rubber mounted to the vehicle body 4 (see FIG. 1). The rear end side of the case member 14 is rubber mounted to a portion 4a of the vehicle body using the mounting portion M. That is, a rubber seat 51 is provided on the portion 4a of the vehicle body, and a stay 55 is fixed to the rubber seat 51 by a bolt 52, a washer 53, and a nut 54. The case member 14 is then mounted to the stay 55 by a bolt 56 which is screwed into the mounting portion M near the rear end portion of the case member 14. The structure is such that, after mounting, a gap between the bolt 52 on the portion 4a side of the vehicle body and the bolt 56 on the case member 14 side is smaller than the screw length (i.e., the threaded length) of the bolt 56, such that even if the bolt 56 were to loosen, it would not come out of the mounting portion M. Therefore, the rear end side of the case member 14 will not detach from the portion 4a of the vehicle body.

Figure 4:
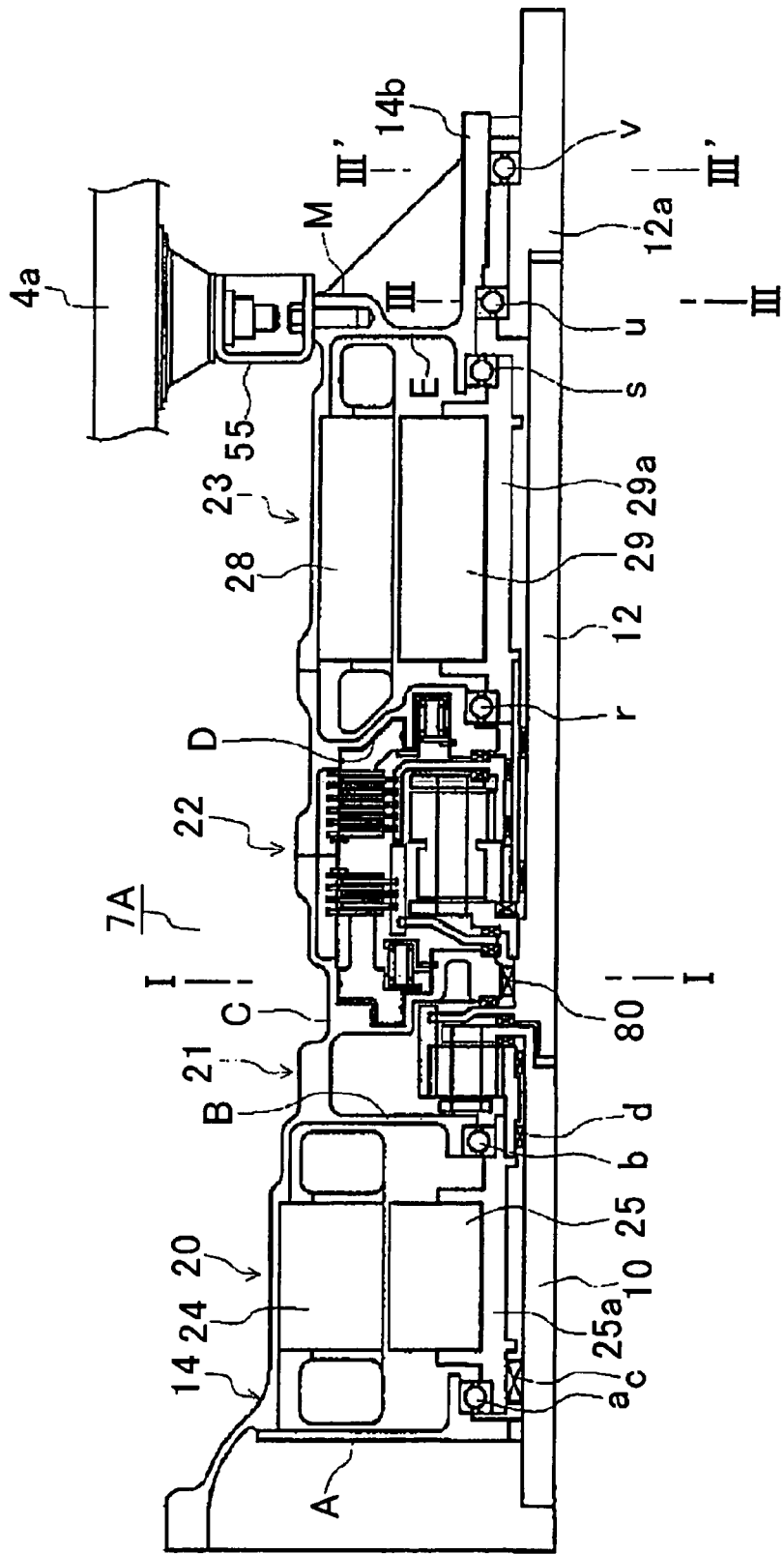
FIG. 4 is a longitudinal sectional view showing the first exemplary embodiment in which a portion of an output shaft support has been modified.

FIG. 4 shows an exemplary embodiment in which a portion of the hybrid drive system 7A shown in FIG. 3 has been modified. In this exemplary embodiment, the bearing 81 interposed between the rotor boss portion 29a of the second electric motor 23 and the output shaft 12 at the rear wall E portion has been omitted. Therefore, the front end portion of the output shaft 12 is directly supported via the bearing 80 by the partition C, just as in the previous exemplary embodiment. The rear end portion of the output shaft, however, is directly supported via the bearings u, v by a cylindrical portion 14b of the case member 14 (i.e., the rear wall E) at the extension shaft 12a which is integrally fitted/connected to the output shaft 12. As a result, the output shaft 12 is directly supported at both end portions by a twin support structure via the bearings 80, u, v by the partition C and the rear wall cylindrical portion 14b, which are both integrated with the case member 14. That is, the output shafts 12, 12a are directly supported via the bearings 80, u, v by a support portion of the partition C along plane I-I and support portions of the cylindrical portion 14b along planes III-III and III'-III', thereby enabling the shafts to be supported with high precision.

Except for the portion described above, this exemplary embodiment is the same as the exemplary embodiment shown in FIG. 3 so only the reference characters of the main portions are shown in the drawing and descriptions thereof are omitted.

Figure 5:
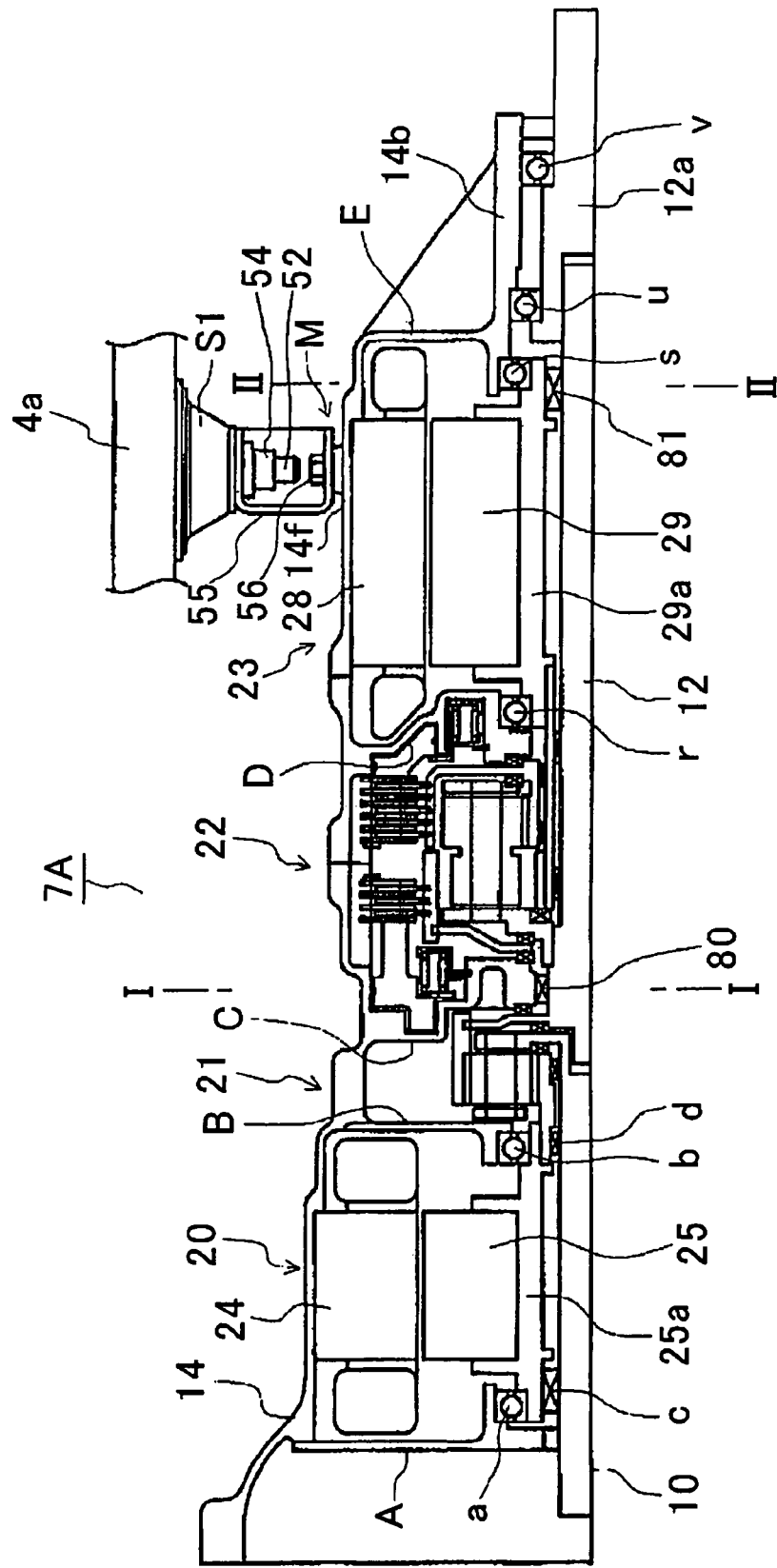
FIG. 5 is a longitudinal sectional view showing the first exemplary embodiment in which a portion of a mount portion has been modified.

FIG. 5 shows yet another exemplary embodiment in which a portion of the hybrid drive system 7A, shown in FIG. 3, has been modified. This exemplary embodiment differs from the last exemplary embodiment with respect to the position of the mounting portion M of the case member 14 rear portion. That is, the mounting portion M is formed on an outer peripheral wall 14f of the rear portion of the portion of the case member 14 which houses the second electric motor 23. The stay 55 is fixed to the mounting portion M via a bolt 56 screwed into a bolt hole in the mounting portion M. With the exception of the portion described above, this exemplary embodiment is the same as the exemplary embodiment shown in FIG. 3 so only the reference characters of the main portions are shown in the drawing and descriptions thereof are omitted.

Figure 6:
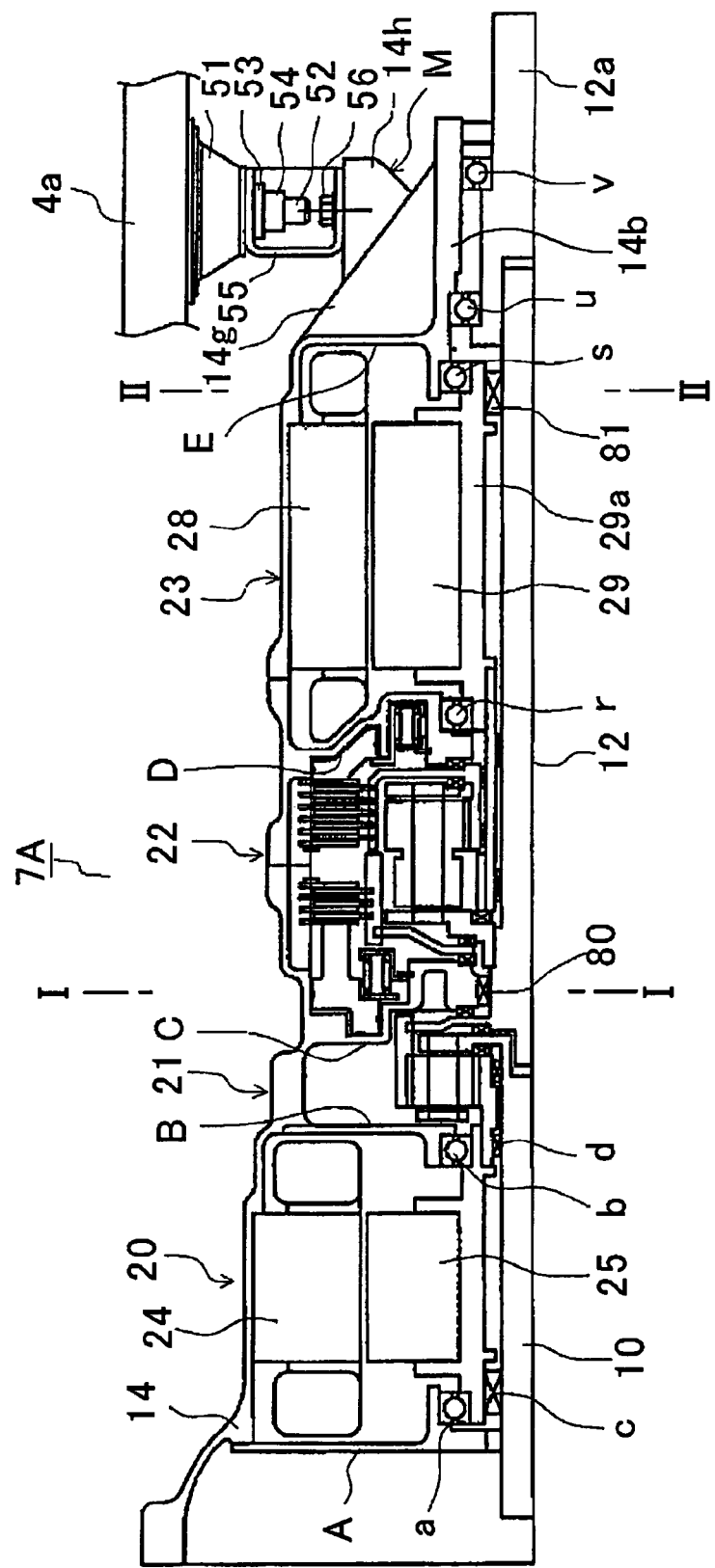
FIG. 6 is a longitudinal sectional view showing the first exemplary embodiment in which the mount portion has been further modified.

FIG. 6 shows another exemplary embodiment in which a portion of the hybrid drive system 7A shown in FIG. 3 has been modified. In this exemplary embodiment, the mounting portion M is disposed farther to the rear of the case member 14. That is, a reinforcing rib 14g is formed between the rear wall E and the cylindrical portion 14b of the case member 14, and a lug 14h which serves as the mounting portion M is formed on the rib 14g portion. The stay 55 is mounted to the lug 14h by a bolt 56. With the exception of the portion described above, this exemplary embodiment is also the same as the exemplary embodiment shown in FIG. 3 so only the reference characters of the main portions are shown in the drawing and descriptions thereof are omitted.

Figure 7:
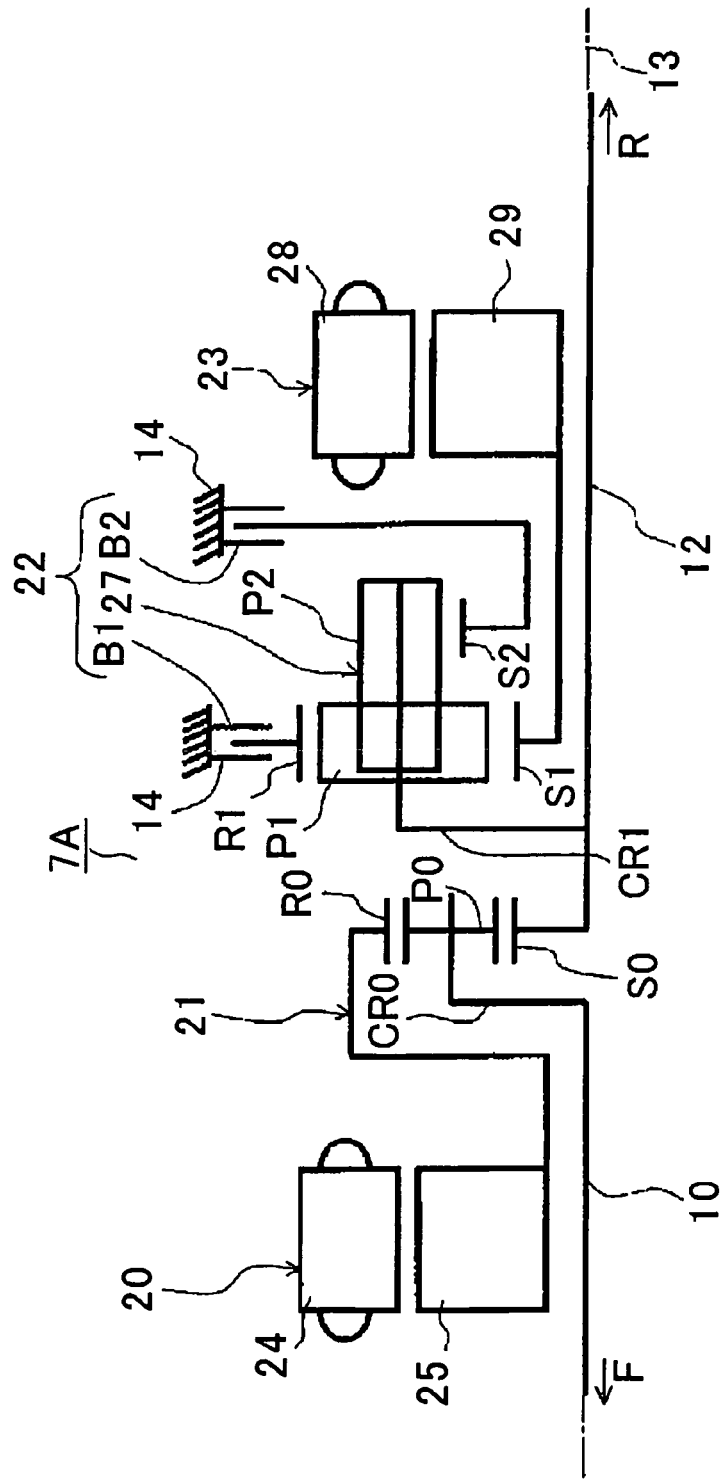
FIG. 7 is a schematic view of a first modified example of the hybrid drive system according to the first exemplary embodiment.

Next, a first modified example of the hybrid drive system 7A will be described with reference to the schematic view of FIG. 7. As shown in FIG. 7, the hybrid drive system 7A includes, in order from the side nearest the internal combustion engine 5 in FIG. 1, i.e., in order from the front to the rear, a first electric motor 20, a power distributing planetary gear 21, a speed change unit 22, and a second electric motor 23, all of which are housed together inside a case member 14 (see FIG. 1) and aligned around a single axis 13. Just as in the hybrid drive system shown in FIG. 3 or 4, an input shaft 10 and an output shaft 12 are also supported in the hybrid drive system shown in FIG. 7. Also, the same mounting system as shown in any one of FIGS. 3 to 6 can be applied to the hybrid drive system shown in FIG. 7.

The first electric motor 20 includes a stator 24 which is fixed to a case member (see FIG. 1) 14, and a rotor 25 which is rotatably supported at the inner radial side of the stator 24. The rotor 25 of the first electric motor 20 is connected to the ring gear R0 of the power distributing planetary gear 21. This kind of first electric motor is mainly used to generate electricity based on power input via the ring gear R0, drive the second electric motor 23 via an inverter (not shown), and charge an HV battery (i.e., a battery for driving the hybrid; not shown).

The power distributing planetary gear 21 is a single pinion planetary gear that is arranged on the same axis as the output shaft 12. The power distributing planetary gear 21 includes a carrier (i.e., a first rotating element) CR0 which supports a plurality of pinions P0, and a sun gear (i.e., a third rotating element) S0 and a ring gear (i.e., a second rotating element) R0 which are both in mesh with the pinions P0. The carrier CR0 of the power distributing planetary gear 21 is connected to the input shaft 10, while the ring gear R0 is connected to a rotor 25 of the first electric motor 20, and the sun gear S0 is connected to the output shaft 12. This kind of power distributing planetary gear 21 distributes power input to the carrier CR0 via the input shaft 10, to the first electric motor 20 side via the ring gear R0, and to the output shaft 12 side via the sun gear S0, based on the speed control of the first electric motor 20. The power distributed to the first electric motor 20 is used to generate electricity, while the power distributed to the output shaft 12 is used to drive the vehicle 1.

The speed change unit 22 has a so-called Ravigneaux type planetary gear unit 27, which includes a double pinion planetary gear and a single pinion planetary gear that has common pinions with the double pinion planetary gear. In addition, the speed change unit 22 also has a first brake B1 and a second brake B2.

The planetary gear unit 27 includes two sun gears S1, S2, a carrier CR1 which supports pinions P1 and pinions (common long pinions) P2, and a ring gear R1. Of the two pinions P1, P2, the pinions P1 are in mesh with the sun gear S1 and the ring gear R1, while the common long pinions P2 are in mesh with the sun gear S2 and the pinions P1. The ring gear R1 of the planetary gear unit 27 is connected to the first brake B1, while the sun gear S2 is connected to the second brake B2. In terms of the speed change unit 22 as a whole, the sun gear S1, which serves as the input member, is connected to a rotor 29 of the second electric motor 23, which will be described next, while the carrier CR1, which serves as the output member, is connected to the output shaft 12, just like the sun gear S0 of the power distributing planetary gear 21 described above. The speed change unit 22 can be switched between two reduced output speeds of different reduction gear ratios by applying either the first brake B1 or the second brake B2 and releasing the other, and conversely, releasing the one and applying the other. That is, the speed change unit 22 changes the amount of power input via the sun gear S1 from the second electric motor 23 and then transmits the resulting power to the output shaft 12 via the carrier CR1.

Of the first electric motor 20, the power distributing planetary gear 21, the speed change unit 22, and the second electric motor 23, the second electric motor 23 is arranged farthest toward the rear, i.e., in a location farthest from the internal combustion engine 5. The second electric motor 23 includes the stator 28 which is fixed to the case member (see FIG. 1) 14, and the rotor 29 which is rotatably supported at the inner radial side of the stator 28. The rotor 29 of the second electric motor 23 is connected to the sun gear S1 of the speed change unit 22. The second electric motor 23 is connected to the HV battery via an inverter, just like the first electric motor 20. The second electric motor 23 assists with driving the output shaft 12 via the speed change unit 22, as well as regenerating electricity.

Figure 8:
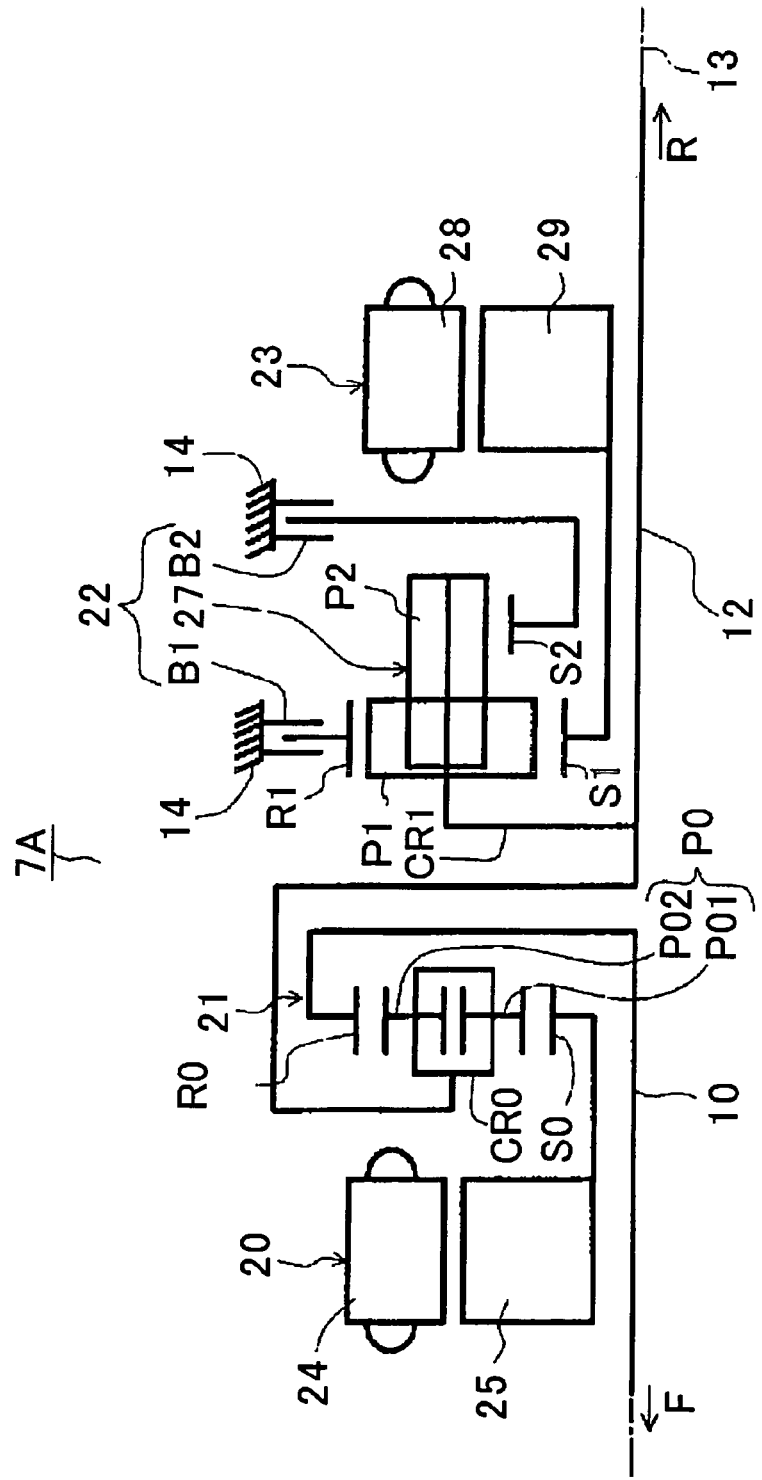
FIG. 8 is a schematic view of a second modified example of the hybrid drive system according to the first exemplary embodiment.

Next, a second modified example of the hybrid drive system 7A will be described with reference to the schematic view of FIG. 8. As shown in FIG. 8, the hybrid drive system 7A includes, in order from the side nearest the internal combustion engine 5 in FIG. 1, i.e., in order from the front to the rear, a first electric motor 20, a power distributing planetary gear 21, a speed change unit 22, and a second electric motor 23, all of which are housed together inside a case member 14 (see FIG. 1) and aligned around a single axis 13. Just as in the hybrid drive system shown in FIG. 3 or 4, an input shaft 10 and an output shaft 12 are also supported in the hybrid drive system shown in FIG. 8. Also, the same mounting system as shown in any one of FIGS. 3 to 6 can be applied to the hybrid drive system shown in FIG. 8.

The first electric motor 20 includes a stator 24 which is fixed to a case member (see FIG. 1) 14, and a rotor 25 which is rotatably supported at an inner radial side of the stator 24. The rotor 25 of the first electric motor 20 is connected to a sun gear S0 of the power distributing planetary gear 21. This kind of first electric motor is mainly used to generate electricity based on power input via the sun gear S0, drive the second electric motor 23 via an inverter (not shown), and charge an HV battery (i.e., a battery for driving the hybrid; not shown).

The power distributing planetary gear 21 is a double pinion planetary gear that is arranged on the same axis as the input shaft 10. The power distributing planetary gear 21 includes a carrier (i.e., a third rotating element) CR0 which supports a plurality of pinions P0 (P01, P02), a sun gear (i.e., a second rotating element) S0 which is in mesh with the pinions P01, and a ring gear (i.e., a first rotating element) R0 which is in mesh with the pinions P02. The ring gear R0 of the power distributing planetary gear 21 is connected to the input shaft 10, while the sun gear S0 is connected to the rotor 25 of the first electric motor 20, and the carrier CR0 is connected to the output shaft 12. This kind of power distributing planetary gear 21 distributes power input to the ring gear R0 via the input shaft 10 to the first electric motor 20 side via the sun gear S0 and to the output shaft 12 side via the carrier CR0, based on the speed control of the first electric motor 20. The power distributed to the first electric motor 20 is used to generate electricity, while the power distributed to the output shaft 12 is used to drive the vehicle 1.

The speed change unit 22 has a so-called Ravigneaux type planetary gear unit 27 which includes a double pinion planetary gear and a single pinion planetary gear that has common pinions with the double pinion planetary gear. In addition, the speed change unit 22 also has a first brake B1 and a second brake B2.

The planetary gear unit 27 includes two sun gears S1, S2, a carrier CR1 which supports pinions P1 and pinions (common long pinions) P2, and a ring gear R1. Of the two pinions P1, P2, the pinions P1 are in mesh with the sun gear S1 and the ring gear R1, while the common long pinions P2 are in mesh with the sun gear S2 and the pinions P1. The ring gear R1 of the planetary gear unit 27 is connected to the first brake B1, while the sun gear S2 is connected to the second brake B2. In terms of the speed change unit 22 as a whole, the sun gear S1, which serves as the input member, is connected to a rotor 29 of the second electric motor 23, which will be described next, while the carrier CR1, which serves as the output member, is connected to the output shaft 12, just like the carrier CR0 of the power distributing planetary gear 21 described above. The speed change unit 22 can be switched between two reduced output speeds of different reduction gear ratios by applying either the first brake B1 or the second brake B2 and releasing the other, and conversely, releasing the one and applying the other. That is, the speed change unit 22 changes the amount of power input via the sun gear S1 from the second electric motor 23 and then transmits the resulting power to the output shaft 12 via the carrier CR1.

Of the first electric motor 20, the power distributing planetary gear 21, the speed change unit 22, and the second electric motor 23, the second electric motor 23 is arranged farthest toward the rear, i.e., in a location farthest from the internal combustion engine 5. The second electric motor 23 includes a stator 28 which is fixed to a case member (see FIG. 1) 14, and the rotor 29 which is rotatably supported at the inner radial side of the stator 28. The rotor 29 of the second electric motor 23 is connected to the sun gear S1 of the speed change unit 22. The second electric motor 23 is connected to the HV battery via an inverter, just like the first electric motor 20. The second electric motor 23 assists with driving the output shaft 12 via the speed change unit 22, as well as regenerating electricity.

Figure 9:
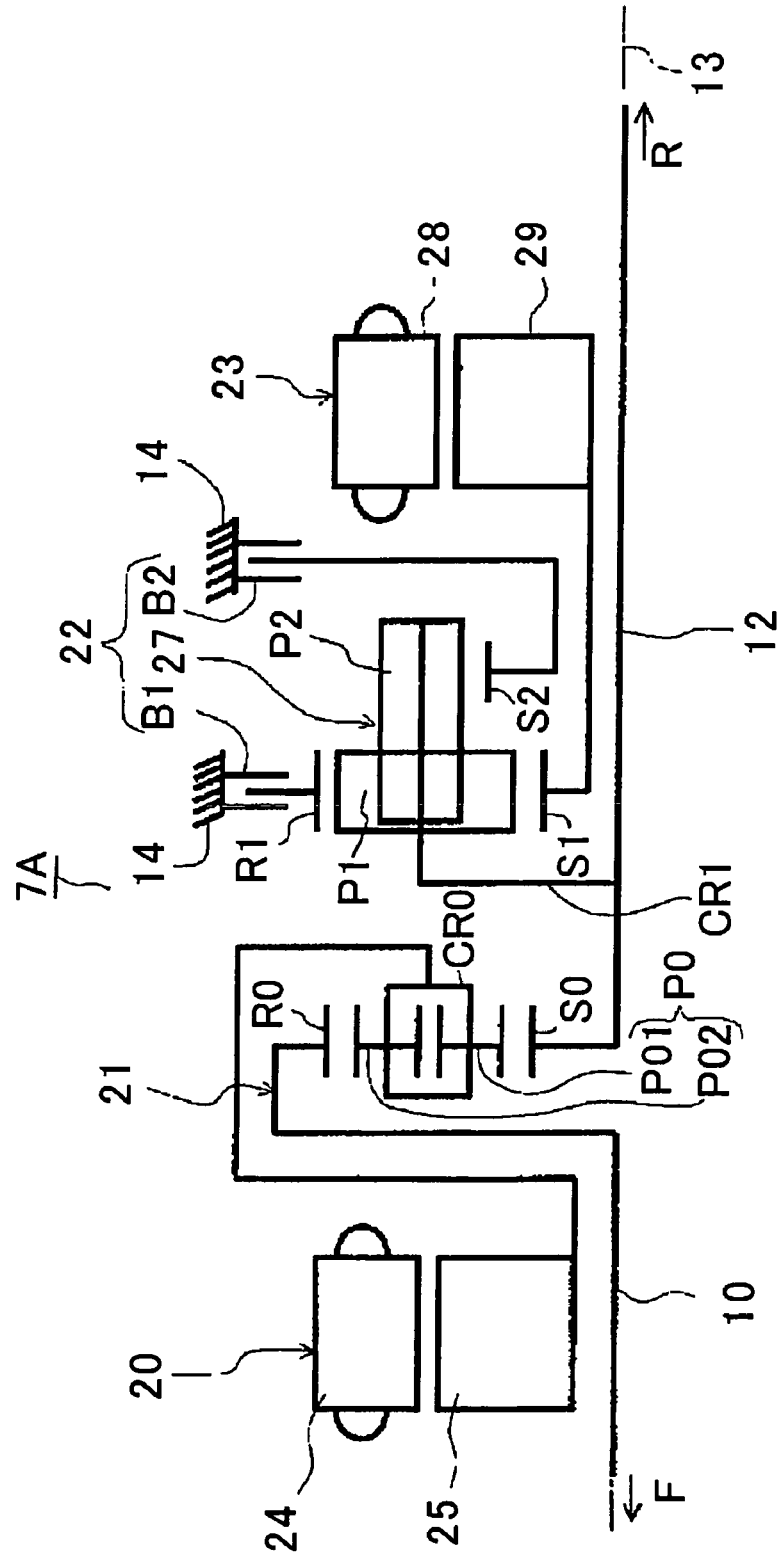
FIG. 9 is a schematic view of a third modified example of the hybrid drive system according to the first exemplary embodiment.

Next, a third modified example of the hybrid drive system 7A will be described with reference to the schematic view of FIG. 9. As shown in FIG. 9, the hybrid drive system 7A includes, in order from the side nearest the internal combustion engine 5 in FIG. 1, i.e., in order from the front to the rear, a first electric motor 20, a power distributing planetary gear 21, a speed change unit 22, and a second electric motor 23, all of which are housed together inside a case member 14 (see FIG. 1) and aligned around a single axis 13. Just as in the hybrid drive system, shown in FIG. 3 or 4, the input shaft 10 and the output shaft 12 are also supported in the hybrid drive system shown in FIG. 9. Also, the same mounting system as shown in any one of FIGS. 3 to 6 can be applied to the hybrid drive system shown in FIG. 9.

The first electric motor 20 includes a stator 24 which is fixed to a case member (see FIG. 1) 14, and the rotor 25 which is rotatably supported at an inner radial side of the stator 24. The rotor 25 of the first electric motor 20 is connected to a carrier CR0 of the power distributing planetary gear 21, which will be described next. This kind of first electric motor is mainly used to generate electricity based on power input via the carrier CR0, drive the second electric motor 23 via an inverter (not shown), and charge an HV battery (i.e., a battery for driving the hybrid; not shown).

The power distributing planetary gear 21 is a double pinion planetary gear that is arranged on the same axis as the input shaft 10. The power distributing planetary gear 21 includes a carrier (i.e., a second rotating element) CR0 which supports a plurality of pinions P0 (P01, P02), a sun gear (i.e., a third rotating element) S0 which is in mesh with the pinions P01, and a ring gear (i.e., a first rotating element) R0 which is in mesh with the pinions P02. The ring gear R0 of the power distributing planetary gear 21 is connected to the input shaft 10, while the carrier CR0 is connected to the rotor 25 of the first electric motor 20, and the sun gear S0 is connected to the output shaft 12. This kind of power distributing planetary gear 21 distributes power input to the ring gear R0 via the input shaft 10, to the first electric motor 20 side via the carrier CR0, and to the output shaft 12 side via the sun gear S0, based on the speed control of the first electric motor 20. The power distributed to the first electric motor 20 is used to generate electricity, while the power distributed to the output shaft 12 is used to drive the vehicle 1.

The speed change unit 22 has a so-called Ravigneaux type planetary gear unit 27 which includes a double pinion planetary gear and a single pinion planetary gear that has common pinions with the double pinion planetary gear. In addition, the speed change unit 22 also has a first brake B1 and a second brake B2.

The planetary gear unit 27 includes two sun gears S1, S2, a carrier CR1 which supports pinions P1 and pinions (common long pinions) P2, and a ring gear R1. Of the two pinions P1, P2, the pinions P1 are in mesh with the sun gear S1 and the ring gear R1, while the common long pinions P2 are in mesh with the sun gear S2 and the pinions P1. The ring gear R1 of the planetary gear unit 27 is connected to the first brake B1, while the sun gear S2 is connected to the second brake B2. In terms of the speed change unit 22 as a whole, the sun gear S1, which serves as the input member, is connected to a rotor 29 of the second electric motor 23, which will be described next, while the carrier CR1, which serves as the output member, is connected to the output shaft 12, just like the sun gear S0 of the power distributing planetary gear 21. The speed change unit 22 can be switched between two reduced output speeds of different reduction gear ratios by applying either the first brake B1 or the second brake B2 and releasing the other, and conversely, releasing the one and applying the other. That is, the speed change unit 22 changes the amount of power input via the sun gear S1 from the second electric motor 23 and then transmits the resulting power to the output shaft 12 via the carrier CR1.

Of the first electric motor 20, the power distributing planetary gear 21, the speed change unit 22, and the second electric motor 23, the second electric motor 23 is arranged farthest toward the rear, i.e., in a location farthest from the internal combustion engine 5. The second electric motor 23 includes a stator 28 which is fixed to a case member (see FIG. 1) 14, and the rotor 29 which is rotatably supported at the inner radial side of the stator 28. The rotor 29 of the second electric motor 23 is connected to the sun gear S1 of the speed change unit 22. The second electric motor 23 is connected to the HV battery via an inverter, just like the first electric motor 20. The second electric motor 23 assists with driving the output shaft 12 via the speed change unit 22, as well as regenerating electricity.

Next, a hybrid drive system 7B according to this exemplary embodiment will be described as another example of the hybrid drive system 7 which is mounted in the vehicle 1 shown in FIG. 1. First, an outline of the overall hybrid drive system 7B will be described with reference to the schematic view of FIG. 10. Then, the detailed structure will be described with reference to FIG. 11. In these drawings, the arrow F points toward the front of the vehicle body (i.e., the internal combustion engine side) and the arrow R points toward the rear of the vehicle body (i.e., the differential mechanism side).

Figure 10:
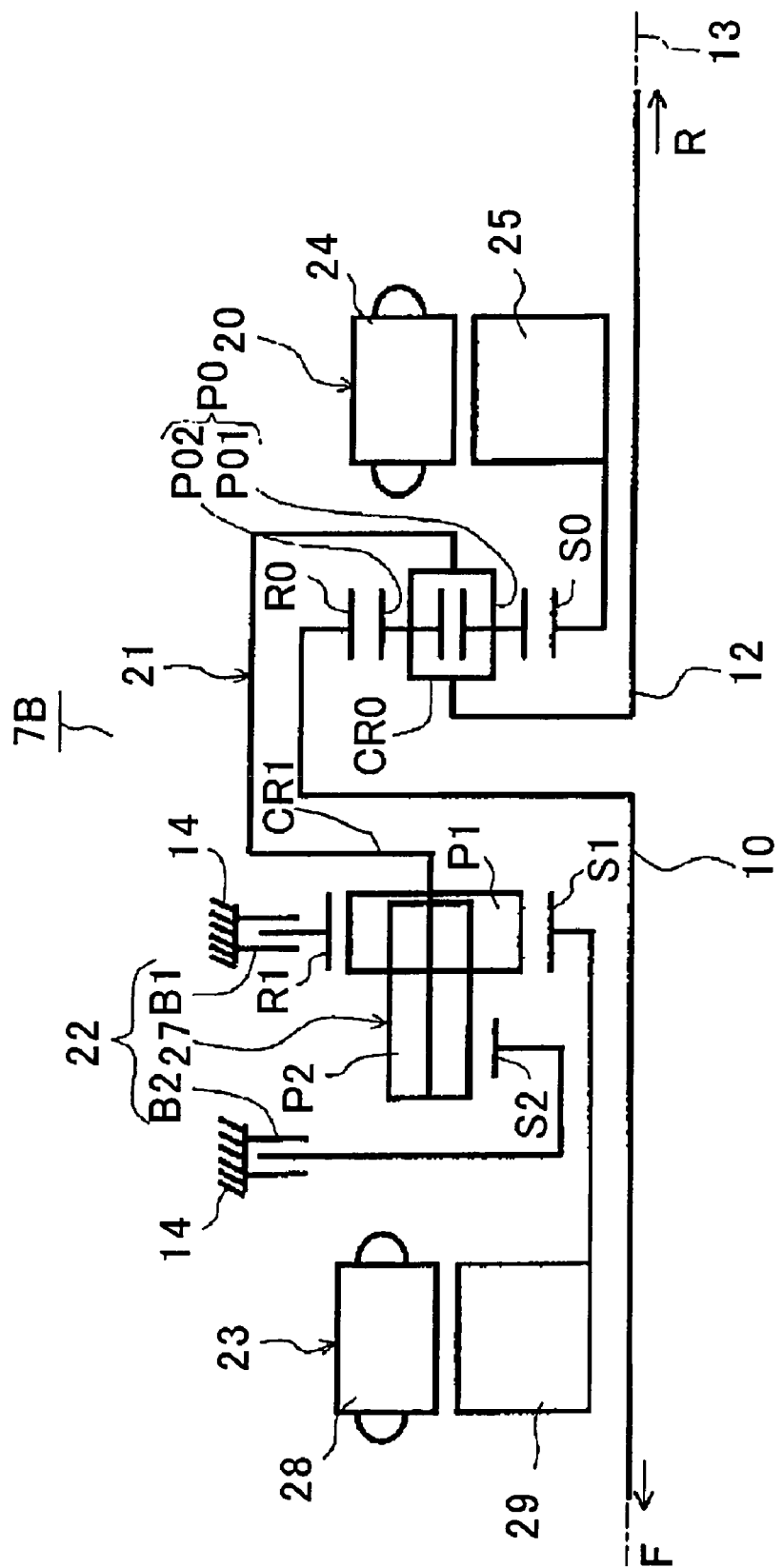
FIG. 10 is a schematic view of a hybrid drive system according to a second exemplary embodiment.

As shown in FIG. 10, the hybrid drive system 7B includes, in order from the side nearest the internal combustion engine 5 in FIG. 1, i.e., in order from the front to the rear, a second electric motor 23, a speed change unit 22, a power distributing planetary gear 21, and a first electric motor 20, all of which are housed in a case member 14 (see FIG. 1) and aligned around a single axis 13. Hereinafter, the foregoing components of the hybrid drive system 7B will be described in the following order: the second electric motor 23, the speed change unit 22, the power distributing planetary gear 21, and the first electric motor 20.

The second electric motor 23 includes a stator 28 which is fixed to a case member (see FIG. 1) 14, and a rotor 29 which is rotatably supported at the inner radial side of the stator 28. The rotor 29 of the second electric motor 23 is connected to the sun gear S1 of the speed change unit 22, which will be described later. The second electric motor 23 is connected to an HV battery (i.e., a battery for driving the hybrid; not shown) and drives the second electric motor 23 via an inverter (not shown), similar to the first electric motor 20 to be described in detail later. The main function of the second electric motor 23, however, is different from that of the first electric motor 20. That is, while the first electric motor 20 is mainly used for generating electricity, the second electric motor 23, on the other hand, mainly functions as a drive motor to assist with powering (i.e., providing driving force to) the vehicle 1. During braking and the like, however, the second electric motor 23 functions as a generator and regenerates vehicle inertia force in the form of electric energy.

The speed change unit 22 has a so-called Ravigneaux type planetary gear unit 27 which includes a double pinion planetary gear and a single pinion planetary gear that has common pinions with the double pinion planetary gear. In addition, the speed change unit 22 also has a first brake B1 and a second brake B2.

The planetary gear unit 27 includes two sun gears S1, S2, a carrier CR1 which supports pinions P1 and pinions (common long pinions) P2, and a ring gear R1. Of the two pinions P1, P2, the pinions P1 are in mesh with the sun gear S1 and the ring gear R1, while the common long pinions P2 are in mesh with the sun gear S2 and the pinions P1. The ring gear R1 of the planetary gear unit 27 is connected to the first brake B1, while the sun gear S2 is connected to the second brake B2. In terms of the speed change unit 22 as a whole, the sun gear S1, which serves as the input member, is connected to the rotor 29 of the second electric motor 23 and the carrier CR1, which serves as the output member, is connected to the output shaft 12, just like a ring gear R0 of the power distributing planetary gear 21, which will be described later. As will be described later, the speed change unit 22 can be switched between two reduced output speeds of different reduction gear ratios by applying either the first brake B1 or the second brake B2 and releasing the other, and conversely, releasing the one and applying the other. That is, the speed change unit 22 changes the amount of power input via the sun gear S1 from the second electric motor 23 and then transmits the resulting power to the output shaft 12 via the carrier CR1.

The power distributing planetary gear 21 is a double pinion planetary gear that is arranged on the same axis as the output shaft 12. The power distributing planetary gear 21 includes a carrier (i.e., a third rotating element) CR0 which supports a plurality of pinions P01, P02, a sun gear (i.e., a second rotating element) S0 which is in mesh with the pinions P01, and a ring gear (i.e., a first rotating element) R0 which is in mesh with the pinions P02. The ring gear R0 of the power distributing planetary gear 21 is connected to an input shaft 10, the sun gear S0 is connected to a rotor 25 of the first electric motor 20, and the carrier CR0 is connected to an output shaft 12. This kind of power distributing planetary gear 21 distributes power input to the ring gear R0 via the input shaft 10, to the first electric motor 20 side via the sun gear S0, and to the output shaft 12 side via the carrier CR0, based on the speed control of the first electric motor 20. The power distributed to the first electric motor 20 is used to generate electricity, while the power distributed to the output shaft 12 is used to drive the vehicle 1.

Of the second electric motor 23, the speed change unit 22, the power distributing planetary gear 21, and the first electric motor 20, the first electric motor 20 is arranged farthest toward the rear, i.e., in a location farthest from the internal combustion engine 5. The first electric motor 20 includes a stator 24 which is fixed to a case member (see FIG. 1) 14, and the rotor 25 which is rotatably supported at an inner radial side of the stator 24. The rotor 25 of the first electric motor 20 is connected to the sun gear S0 of the power distributing planetary gear 21. This kind of first electric motor is mainly used to generate electricity based on power input via the sun gear S0, drive the second electric motor 23 via an inverter, and charge an HV battery.

Here, of the second electric motor 23, the speed change unit 22, the power distributing planetary gear 21, and the first electric motor 20, the first and second electric motors 20, 23 are so-called heavy loads which are heavy compared to the power distributing planetary gear 21 and the speed change unit 22. As shown in FIG. 10, in this exemplary embodiment, the speed change unit 22 and the power distributing planetary gear 21 are arranged adjacent to one another, and the second electric motor 23 and the first electric motor 20, which are the heavy loads, are arranged so as to sandwich the speed change unit 22 and the power distributing planetary gear 21 in the longitudinal direction. Also, of the second electric motor 23, the speed change unit 22, the power distributing planetary gear 21, and the first electric motor 20, the first electric motor 20, which is one of the heavy loads, is arranged farthest to the rear, i.e., in a location farthest away from the internal combustion engine 5.

Figure 11:
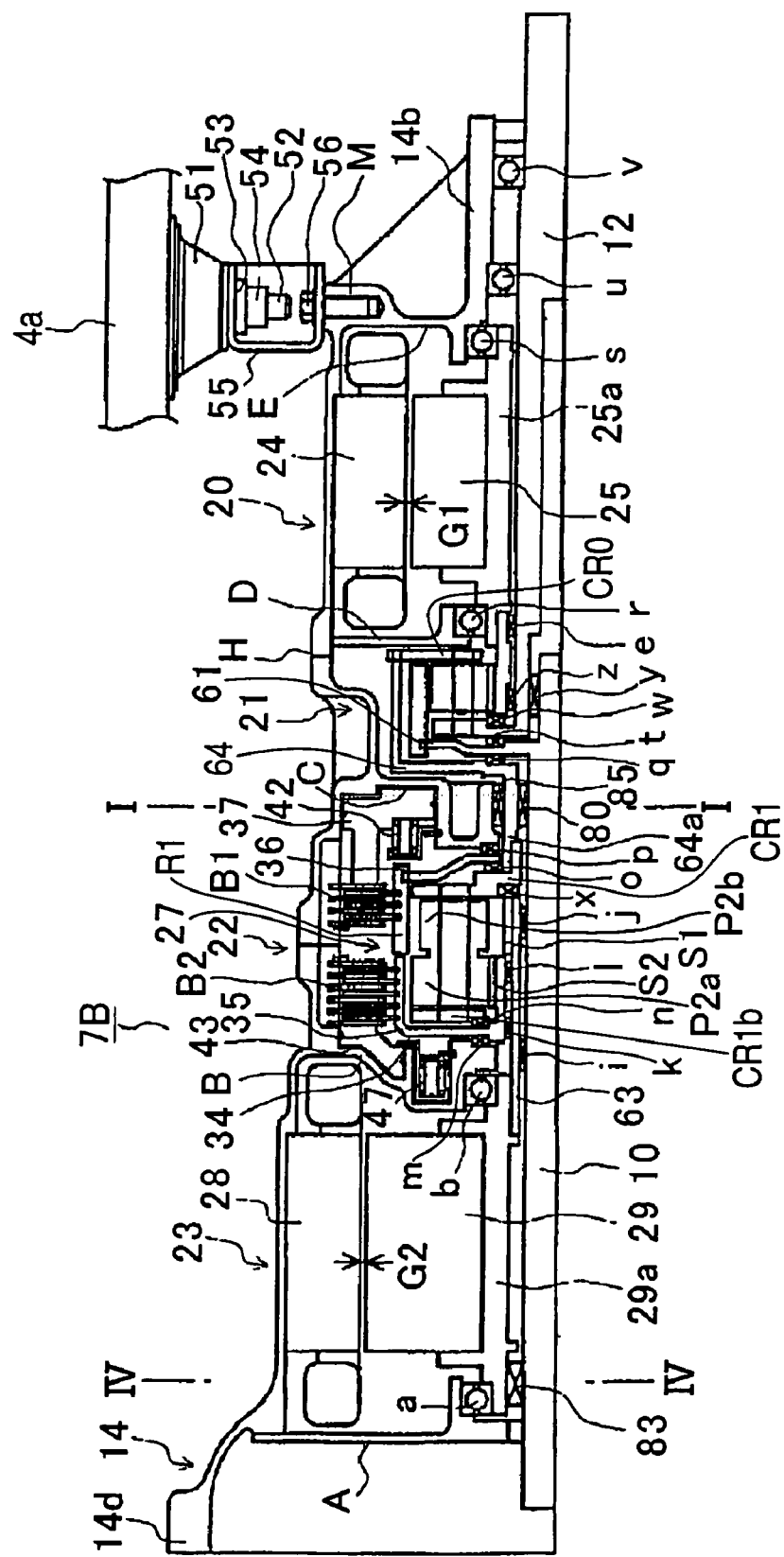
FIG. 11 is a longitudinal sectional view showing the structure of the hybrid drive system according to the second exemplary embodiment.

The operation and effects of the hybrid drive system 7B described with reference to the schematic view in FIG. 10 will be described after the detailed structure of the hybrid drive system 7B is described with reference to FIG. 11. FIG. 11 shows half of a longitudinal cross-section that includes the single axis 13 of the hybrid drive system 7B.

The hybrid drive system 7B shown in the drawing includes the input shaft 10 and the output shaft 12, both of which are arranged on the single axis 13, and the second electric motor 23, the speed change unit 22, the power distributing planetary gear 21, and the first electric motor 20, which are arranged around the single axis 13. All of these are housed in the case member 14. A portion on the rear end side of the output shaft 12, however, protrudes to the rear from the case member 14.

In consideration of assembly and the like, the case member 14 is integrally constructed of a plurality of separate portions which are joined together at joint surfaces in the longitudinal direction along the single axis 13. For example, one joint surface H is located near the front portion of the first electric motor 20. The other joint surfaces are not shown in the drawing. A plurality of partitions, i.e., partitions A, B, C, D, E, in order from the front, are formed in different locations in the longitudinal direction in the case member 14. Of these partitions A to E, the partition A is arranged near the front end of the case member 14 and the partition E is arranged near the rear end of the case member 14. The space in the case between the partitions A, E is divided into four separate spaces in the longitudinal direction along the single axis 13 by the partitions B, C, D. In addition to serving as strengthening members of the case member 14, the partitions A to E also hold bearings (to be described later), and form hydraulic pressure chambers (to be described later).

The second electric motor 23, the speed change unit 22, the power distributing planetary gear 21, and the first electric motor 20 are housed within the four spaces that are separated by the partitions A to E, respectively. That is, the second electric motor 23 is housed between the partitions A, B, the speed change unit 22 between the partitions B, C, the power distributing planetary gear 21 between the partitions C, D, and the first electric motor 20 between the partitions D, E. Hereinafter, the foregoing components will be described in detail in order starting with the second electric motor 23.

The second electric motor 23 is, for example, a permanent magnet alternating current synchronous motor (brushless DC motor), and is arranged at the outer radial side of the input shaft 10 coaxially with the input shaft 10. The second electric motor 23 includes a stator 28 which is fixed to the inner peripheral surface of the case member 14 and a rotor 29 which rotatably arranged across a predetermined air gap G2 at the inner radial side with respect to the stator 28. At the inner radial side of the rotor 29 is a cylindrical boss portion 29a. Stepped portions are formed on both the outer peripheral surface of the front portion of the boss portion and the outer peripheral surface of the rear portion of the boss portion. The rotor 29 is rotatably supported by the case member 14 via bearings a, b fitted in positions in the longitudinal direction between the stepped portions and the partitions A, B at the front end portion and the rear end portion, respectively, of the boss portion 29a. Also, the rear end of the boss portion 29a is connected to the sun gear S1 of the speed change unit 22, which will be described later, via a sleeve 63 which is fit over the outer peripheral surface of the input shaft 10. In this way, the rotor 29 of the second electric motor 23 is rotatably supported by the bearings a, b which are mounted to the partitions A, B, so the position of the rotor 29 in both the longitudinal direction as well as in the radial direction can be precisely maintained. As a result, the predetermined air gap G2 between the stator 28 and rotor 29 can be precisely maintained even if force is applied to the case member 14 which causes it to flex in the vertical direction or in the lateral direction, for example. As described above, the second electric motor 23 is connected to the HV battery and drives the second electric motor 23 via the inverter, similar to the first electric motor 20, which will be described later.

The front end portion of the input shaft 10 is supported via the rotor boss portion 29a (i.e., indirectly) by the bearing 83 provided in a position overlapping in the axial direction with the bearing a. The rear end portion of the input shaft 10 is supported via a bearing 85, a connecting member boss portion 64a, and a bearing 80 by the partition C, which separates the speed change unit 22 and the power distributing planetary gear 21. The bearing 85, which is mounted to the partition C, and the bearing 80 which fits over the input shaft 10 are arranged in positions which overlap in the axial direction. Therefore, the rear end portion of the input shaft 10 is supported by the bearing 80 via the connecting member boss portion 64a (i.e., indirectly) at a portion along plane I-I, along which also lies the bearing mounting surface of the partition C. As a result, the input shaft 10 is rotatably supported at both end portions by a twin support structure indirectly via the bearings 83, 80 along planes IV-IV and I-I, along which lie the bearing mounting surfaces of the partitions A, C, so that the shaft is supported with a high degree of precision. The sleeve 63 that connects the rotor 29 and the sun gear S1 is rotatably supported by the input shaft 10 via bearings i, j.

The speed change unit 22 is arranged between the partitions B, C of the case member 14, i.e., substantially in the middle in the lengthwise direction (i.e., in the direction along the single axis 13) of the case member 14. The speed change unit 22 includes a Ravigneaux type planetary gear unit 27 arranged at the inner radial side, a first brake B1 arranged on the rear side at the outer radial side of the Ravigneaux type planetary gear unit 27, and a second brake B2 arranged on the front side at the outer radial side of the Ravigneaux type planetary gear unit 27.

The planetary gear unit 27 includes a first sun gear S1 (hereinafter simply referred to as "sun gear S1"), a second sun gear S2 (hereinafter simply referred to as "sun gear S2") arranged slightly to the outer radial side of the sun gear S1 as well as in front of the sun gear S1, a ring gear R1 which is arranged on the outer radial side of the sun gear S1, pinions P1 which are in mesh with the sun gear S1 and the ring gear R1, common long pinions P2 which are in mesh with the sun gear S2 and the pinions P1, and a carrier CR1 which supports the pinions P1, P2 (see FIG. 10).

The sun gear S1 is connected to the rear end of the rotor 29 of the second electric motor 23 via the sleeve 63. The sun gear S1 is relatively rotatably supported by the input shaft 10 via the sleeve 63 as well as via the bearings i, j which are fitted to the outer peripheral surface of the input shaft 10.

The sun gear S2 is such that a flange portion, which extends from the front end side of the sun gear S2 to the outer radial side along a front side carrier plate CR1b of the carrier CR1, and a drum portion 35, which extends rearward from the outer radial side end portion of the flange portion, are integrally formed. A second brake B2, to be described later, is interposed between the outer peripheral surface of the drum portion 35 and the inner peripheral splines of the inner peripheral surface of the case member 14. The sun gear S2 is rotatably supported via bearings k, l which are fitted in the outer peripheral surface of the sleeve 63 which is integrated with the sun gear S1, as well as via bearings m, n which are fitted to the front surface and rear surface, respectively, at the inner radial side (i.e., the base end side) of the flange portion. The bearing m is interposed between the inner radial side front surface of the flange portion and the inner radial side rear surface of the partition B. The bearing n is interposed between the inner radial side rear surface of the flange portion and the inner radial side front surface of the front side carrier plate CR1b of the carrier CR1, to be described later.

A flange portion 36, which extends to the inner radial side along a rear side carrier plate of the carrier CR1, is fixed to the rear end portion of the ring gear R1 such that the ring gear R1 is rotatably supported by bearings o, p which are fitted to the front surface and rear surface, respectively, at the inner radial side of the flange portion 36. The bearing o is interposed between the front surface of the flange portion 36 and the rear side carrier plate of the carrier CR1. The bearing p is interposed between the inner radial side rear surface of the flange portion 36 and the inner radial side front surface of the partition C. A first brake B1 is interposed between the outer peripheral surface of the ring gear R1 and inner peripheral splines on the inner peripheral surface of the case member 14.

The pinions P1 are rotatably supported by the carrier CR1, and are in mesh with the sun gear S1 at the inner radial side as well as with the ring gear R1 at the outer radial side.

The pinions P2 are common long pinions which have a large diameter gear P2a formed on the front side and a small diameter gear P2b formed on the rear side. These gears P2a, P2b are integrally formed together. The large diameter gear P2a of the pinions P2 is in mesh with the sun gear S2, and the small diameter gear P2b of the pinions P2 is in mesh with the pinions P1.

The carrier CR1 rotatably supports the pinions P1, P2 with a front side carrier plate CR1b and a rear side carrier plate. The rear side carrier plate is connected to the rear side carrier plate of the carrier CR0 of the power distributing planetary gear 21, which will be described later, via a connecting member 64. The connecting member 64 is formed of a boss portion 64a, a flange portion, and a drum portion. The boss portion 64a is connected to the inner radial side rear end of the rear side carrier plate of the carrier CR1 and extends to the rear. The flange portion extends to the outer radial side from the rear end of the boss portion 64a, and the drum portion extends to the rear from an outer radial side end portion of the flange portion. The boss portion 64a is rotatably supported via the bearing 85 that is mounted to the inner peripheral surface of the partition C which separates the speed change unit 22 and the power distributing planetary gear 21. The carrier CR1 is relatively rotatably supported via the bearing k, which is fitted to the front surface at the inner radial side of the front side carrier plate, as well as via bearings x, o which are fitted to the front surface and the rear surface, respectively, at the inner radial side of the rear side carrier plate. The bearing x is interposed between the front surface of the rear side carrier plate and the rear end surface of the sun gear S1.

The first brake B1 has multiple discs and friction plates (brake plates). Outer peripheral splines formed on the outer peripheral surface of the ring gear R1, described above, are spline-engaged, by means of the multiple discs and friction plates, with inner peripheral splines formed on the inner peripheral surface of the case member 14. A first brake hydraulic actuator 37 is arranged at the rear side of the first brake B1. The hydraulic actuator 37 includes a piston, a first hydraulic pressure chamber, and a return spring (i.e., a compression spring) 42. The piston is arranged so as to be able to move in the longitudinal direction at the rear of the first brake B1. The first hydraulic pressure chamber is formed in the outer radial side front surface of the partition C such that the rear end side of the piston fits into the first hydraulic pressure chamber with an oil tight fit. The return spring 42 is interposed between a retainer fixed to the partition C and the inner radial side front surface of the piston, and urges the piston toward the rear.

The second brake B2 is arranged immediately in front of the first brake B1. The second brake B2 has multiple discs and friction plates (brake plates). Outer peripheral splines formed on the outer peripheral surface of the drum portion 35 which is integrated with the sun gear S2, by means of the multiple discs and friction plates, are spline-engaged with inner peripheral splines formed on the inner peripheral surface of the case member 14. A second brake hydraulic actuator 43 is arranged at the front side of the second brake B2. The hydraulic actuator 43 includes a piston, a second hydraulic pressure chamber, and a return spring (i.e., a compression spring) 47. The piston is arranged so as to be able to move in the longitudinal direction at the front of the second brake B2. The second hydraulic pressure chamber is formed in the outer radial side rear surface of the partition B such that the front end side of the piston fits into the second hydraulic pressure chamber with an oil tight fit. The return spring 47 is interposed between a retainer fixed to the partition B and the inner radial side rear surface of the piston, and urges the piston toward the front.

In the speed change unit 22 of the foregoing structure, output from the second electric motor 23 is transmitted to the sun gear S1 via the sleeve 63. In Lo speed, the first brake B1 is applied and the second brake B2 is released. Accordingly, the ring gear R1 is held and the sun gear S2 rotates freely. The rotation of the first sun gear S1 is greatly reduced in speed by the pinions P1 and transmitted to the carrier CR1. The rotation of the carrier CR1 is then transmitted to the output shaft 12.

When the speed change unit 22 is in Hi speed, the first brake B1 is released and the second brake B2 is applied. Accordingly, the sun gear S2 is held and the ring gear R1 rotates freely. In this state, the rotation of the sun gear S1 is transmitted to the pinions P1. Also, the pinions P2 are in mesh with the sun gear S2, which is held, so the carrier CR1 revolves at a controlled predetermined speed. At this time, the rotation of the carrier CR1, the speed of which has been reduced a relatively small amount, is transmitted to the output shaft 12.

Thus, when the speed change unit 22 is in Lo speed, the first brake B1 is applied and the second brake B2 is released such that rotation which has been greatly reduced in speed is transmitted to the output shaft 12. When the speed change unit 22 is in Hi speed, on the other hand, the first brake B1 is released and the second brake B2 is applied such that rotation in which the speed has been reduced a relatively small amount is transmitted to the output shaft 12. In this way, the speed change unit 22 can shift between two speeds, thus making it possible to make the second electric motor 23 compact. That is, using a small electric motor, it is possible, for example, to transmit sufficient drive torque to the output shaft 12 by using Lo speed during take-off of the vehicle 1, which requires a large amount of torque, and then shift to Hi speed when the output shaft 12 is rotated at high speed in order to keep the rotor 29 from rotating at high speed.

The power distributing planetary gear 21 is arranged between the partitions C, D of the case member 14. The power distributing planetary gear 21 is a double pinion planetary gear that is arranged on the same axis as the output shaft 12 and includes the ring gear (i.e., the first rotating element) R0, the sun gear (i.e., the second rotating element) S0, and the carrier (i.e., the third rotating element) CR0 which supports the pinions P01, P02 (see FIG. 10). Of these, the ring gear R0 extends forward where it is fixed to the outer radial side end portion of a flange 61 which extends to the outer radial side along the carrier CR0 from the outer peripheral surface near the rear end of the input shaft 10. Also, the front side carrier plate of the carrier CR0 is connected to the front end of the output shaft 12. The sun gear S0 extends toward the rear and is connected to the rotor 25 of the first electric motor 20. Bearings are fitted in the following locations with respect to the power distributing planetary gear 21. A bearing q is fitted between the inner radial side rear surface of the flange portion of the connecting member 64 and the inner radial side front surface of the flange portion 61. A bearing t is fitted between the inner radial side rear surface of the flange portion 61 and the inner radial side front surface of the front side carrier plate. A bearing w is fitted between the inner radial side rear surface of the front side carrier plate and the rear end surface of the sun gear S0. In addition, a bearing y is fitted between the outer peripheral surface of a front end portion of the input shaft 10 and the inner peripheral surface of a cylindrical portion of the rear end of the output shaft 12. Bearings z, e are fitted between the outer peripheral surface of the cylindrical portion of the output shaft and the inner peripheral surface of the sun gear S0. These bearings rotatably support the ring gear R0, which is integrated with the input shaft 10, with respect to the case member 14, as well as relatively rotatably support the carrier CR0 and the sun gear S0 with respect to the output shaft 12. Thus, in the power distributing planetary gear 21, the ring gear R0, which serves as the input portion, is fixed to the input shaft 10, the sun gear S0, which serves as an output portion (i.e., a power distributing target), is connected to the front end of the rotor 25 of the first electric motor 20, and the carrier CR0, which also serves as an output portion (i.e., a power distributing target), is connected to the front end of the output shaft 12. The power distributing planetary gear 21 distributes power from the internal combustion engine 5 (see FIG. 1) input to the ring gear R0 via the input shaft 10 to both the first electric motor 20 side via the sun gear S0 and the output shaft 12 side via the carrier CR0. The ratio of power distribution at this time is determined based on the operating state of the first electric motor 20, which will be described next. That is, when a large amount of power is generated by the rotor 25 of the first electric motor 20, the amount of electricity generated by the first electric motor 20 increases, and the power output to the output shaft 12 decreases proportionately. Conversely, when only a small amount of power is generated by the rotor 25 of the first electric motor 20, the amount of electricity generated by the first electric motor 20 decreases, and the power output to the output shaft 12 proportionately increases.

The first electric motor 20 is, for example, a permanent magnet alternating current synchronous motor (a brushless DC motor), and is housed between the partitions D, E, and arranged on the outer radial side of, and on the same axis as, the output shaft 12. The first electric motor 20 has a stator 24 that is fixed to the inner peripheral surface of the case member 14 and the rotor 25 that is rotatably disposed across a predetermined air gap G1 on the inner radial side with respect to the stator 24. The inner radial side of the rotor 25 is a cylindrical boss portion 25*a*. Step portions are formed on the outer radial peripheral surfaces of both a front portion and a rear portion of the boss portion 25*a*. The rotor 25 is rotatably supported by the case member 14 via bearings r, s which are fitted in a state positioned in the longitudinal direction between the partitions D, E, respectively, and the step portions. Thus, because the rotor 25 of the first electric motor 20 is rotatably supported via the bearings r, s which are fixed to the partitions D, E, respectively, the position of the rotor 25 in both the longitudinal direction as well as in the radial direction can be precisely maintained. As a result, the predetermined air gap G1 between the stator 24 and rotor 25 can be precisely maintained even if force is applied to the case member 14 which causes it to flex in the vertical direction or in the lateral direction, for example.

As described above, the first electric motor 20 is connected to the HV battery via the inverter. The main function of the first electric motor 20 having this kind of structure is to generate electricity based on power distributed to the sun gear S0 of the power distributing planetary gear 21 to drive the second electric motor 23 via the inverter, and to charge the HV battery.

The front end portion of the output shaft 12 is supported, via the bearing r, the boss portion 25*a*, the sun gear S0 boss portion which is integrated with the boss portion 25*a*, and the bearing e, by the partition D that supports the front end portion of the rotor boss portion 25*a*. The bearing e is in a position that overlaps in the axial direction with the bearing r that is mounted to the partition D. Therefore, the front end portion of the output shaft 12 is supported via the boss portion 25*a* (i.e., indirectly) at a portion along the same plane that the bearing mounting surface of the partition D lies on.

A cylindrical boss portion (cylindrical portion) 14*b* is formed protruding to the rear on the rear wall E of the case member 14, such that the rear end portion of the output shaft 12 is rotatably supported by the cylindrical portion 14*b* via two bearings u, v which are separated from each other in the axial direction. As a result, the output shaft is supported by a twin support structure via the bearings e, u, v by the partitions D, E (i.e., the cylindrical portion 14*b* thereof) that are integrated with the case member, such that the output shaft is supported with high precision.

Also, in the case member 14, the outer radial side of the partition E is thickly formed and serves as a mounting portion M. A connecting portion 14*d* at the front end side of the case member 14 is connected to the internal combustion engine 5, which is rubber mounted to the vehicle body 4 (see FIG. 1). The rear end side of the case member 14 is rubber mounted to a portion 4*a* of the vehicle body using the mounting portion M. That is, a rubber seat 51 is provided on the portion 4*a* of the vehicle body, and a stay 55 is fixed to the rubber seat 51 by a bolt 52, a washer 53, and a nut 54. The case member 14 is then mounted to the stay 55 by a bolt 56 which is screwed into the mounting portion M near the rear end portion of the case member 14. The structure is such that, after mounting, a gap between the bolt 52 on the portion 4*a* side of the vehicle body and the bolt 56 on the case member 14 side is smaller than the screw length (i.e., the threaded length) of the bolt 56, so that even if the bolt 56 were to loosen, it would not come out of the mounting portion M. Therefore, the rear end side of the case member 14 will not detach from the portion 4*a* of the vehicle body.

FIG. 12 shows an exemplary embodiment in which a portion of the hybrid drive system 7B shown in FIG. 11 has been modified. In this exemplary embodiment the front end side of the input shaft 10 is directly supported via the bearing 84 by the partition A. Therefore, the front end portion of the input shaft 10 is directly supported by the partition A via the bearing 84 at a portion along the same plane V-V that the bearing mounting surface of the partition A lies on. Further, the rear end portion of the input shaft 10 is supported by the partition C by the bearing 80 indirectly via the connecting member boss portion 64*a* at a portion along the same plane I-I that the bearing mounting surface of the partition C lies on. As a result, both end portions of the input shaft 10 are supported by a twin support structure by the partitions A, C, via the bearings 81, 80, respectively, such that the input shaft 10 is supported with high precision. Except for the portion described above, this exemplary embodiment is the same as the exemplary embodiment shown in FIG. 11 so only the reference characters of the main portions are shown in the drawing and descriptions thereof are omitted.

In summary, as described above, either the input shaft or the output shaft, whichever is not supported by the partition, is supported by a support portion that supports a rotor of the first or second electric motor. That, in combination with the fact that shaft can be made relatively short, enables the precision with which both the input shaft and output shaft are supported to be improved.

Additionally, the first and second electric motors, which are heavy, are arranged on the single axis in such a way that one electric motor is arranged at the front end side and the other electric motor is arranged at the rear end side. As a result, vibration resistance of the hybrid drive system can be improved. In addition, quietness in the vehicle cabin can also be improved because the rear end portion that is adjacent to the vehicle cabin is an electric motor.

Further, a structure can be employed in which the front portion of the case member can be connected to the internal combustion engine and the rear end portion of the case member can be mounted to the vehicle body. As a result, vibrations of the hybrid drive system can be reduced.

As described, the second electric motor, which is the heaviest, is arranged at the rear end side of the case member. As a result, not only is vibration resistance improved, but the power path is also more rational because the second electric motor is adjacent to the speed change unit and the first electric motor is adjacent to the power distributing planetary gear.

With such a structural arrangement, the output shaft becomes longer. To address this issue, the long output shaft is supported via a bearing member at both the partition portion and the rear support portion part of the second electric motor. As a result, the precision with which the output shaft is supported is improved and the relatively short input shaft is rotatably supported by both support portions of the first electric motor, which together enable the performance and reliability of the hybrid drive system to be improved.

Further, as described, the first electric motor, which is heavy, is arranged at the rear end side of the case member. As a result, not only is vibration resistance improved, but the power path is also more rational because the first electric motor is adjacent to the power distributing planetary gear and the second electric motor is adjacent to the speed change unit.

However, with such a structural arrangement, the input shaft becomes longer. Thus, the long input shaft is supported via a bearing member at both the front support portion of the second electric motor and the partition portion. As a result, the precision with which the input shaft is supported is improved and the relatively short output shaft is rotatably supported by both support portions of the first electric motor, which together enable the performance and reliability of the hybrid drive system to be improved.

Finally, the hybrid drive system is mounted in a FR type vehicle. As a result such a vehicle can be provided which has good fuel efficiency, reduced vibrations, and superior quietness.

What is claimed is:

1. A hybrid drive system, comprising:
   an input shaft which inputs power from an internal combustion engine;
   an output shaft which is arranged aligned on a single axis with the input shaft and is operatively linked to a driven wheel;
   a first electric motor which is arranged on the single axis and has a stator and a rotor;
   a power distributing planetary gear which is arranged on the single axis and has a first rotating element connected to the input shaft, a second rotating element connected to the rotor of the first electric motor, and a third rotating element connected to the output shaft;
   a second electric motor which is arranged on the single axis and has a stator and a rotor; and
   a speed change unit which is arranged on the single axis and changes a rotation of the rotor of the second electric motor and transmits the resulting rotation to the output shaft,
   wherein the first electric motor, the power distributing planetary gear, the second electric motor, and the speed change unit are all housed in a case member and arranged aligned on the single axis such that the power distributing planetary gear and the speed change unit are adjacent to one another;
   the stators of the first and second electric motors are fixed to the case member, and the rotors of the first and second electric motors are rotatably supported by a support portion integrated with the case member;
   a partition integrated with the case member is provided between the power distributing planetary gear and the speed change unit; and
   one shaft, from among the input shaft and the output shaft, has a twin support structure in which one end portion of the shaft is rotatably supported, either directly or indirectly via a bearing member, by the partition part and the other end portion of the shaft is rotatably supported, either directly or indirectly via a bearing member, by the support portion part which supports the rotor.

2. The hybrid drive system according to claim 1, wherein the other shaft, from among the input shaft and the output shaft, is rotatably supported either directly or indirectly by two support portions which support the rotor of the first or second electric motor.

3. The hybrid drive system according to claim 2, wherein the speed change unit and the power distributing planetary gear, which are arranged adjacent to one another are positioned between the first electric motor and the second electric motor on the single axis.

4. A vehicle, comprising:
   a vehicle body suspended by a front wheel and a rear wheel;
   an internal combustion engine mounted to the vehicle body; and
   the hybrid drive system according to claim 3 mounted to the vehicle body,
   wherein the internal combustion engine and the hybrid drive system are arranged in order from the front of the vehicle body with an output shaft of the internal combustion engine aligned on the single axis and the single axis pointing in the longitudinal direction of the vehicle body, and
   the input shaft of the hybrid drive system is connected to the output shaft of the internal combustion engine and the output shaft of the hybrid drive system is operatively linked to the rear wheel.

5. The hybrid drive system according to claim 2, wherein a mount portion which can be mounted to a vehicle body is provided on a rear end portion of the case member.

6. A vehicle, comprising:
   a vehicle body suspended by a front wheel and a rear wheel;
   an internal combustion engine mounted to the vehicle body; and
   the hybrid drive system according to claim 5 mounted to the vehicle body,
   wherein the internal combustion engine and the hybrid drive system are arranged in order from the front of the vehicle body with an output shaft of the internal combustion engine aligned on the single axis and the single axis pointing in the longitudinal direction of the vehicle body, and
   the input shaft of the hybrid drive system is connected to the output shaft of the internal combustion engine and the output shaft of the hybrid drive system is operatively linked to the rear wheel.

7. A vehicle, comprising:
   a vehicle body suspended by a front wheel and a rear wheel;
   an internal combustion engine mounted to the vehicle body; and
   the hybrid drive system according to claim 2 mounted to the vehicle body,
   wherein the internal combustion engine and the hybrid drive system are arranged in order from the front of the vehicle body with an output shaft of the internal combustion engine aligned on the single axis and the single axis pointing in the longitudinal direction of the vehicle body, and
   the input shaft of the hybrid drive system is connected to the output shaft of the internal combustion engine and the output shaft of the hybrid drive system is operatively linked to the rear wheel.

8. The hybrid drive system according to claim 1, wherein the speed change unit and the power distributing planetary gear, which are arranged adjacent to one another, are positioned between the first electric motor and the second electric motor on the single axis.

9. A vehicle, comprising:
   a vehicle body suspended by a front wheel and a rear wheel;
   an internal combustion engine mounted to the vehicle body; and
   the hybrid drive system according to claim 8 mounted to the vehicle body, wherein the internal combustion engine and the hybrid drive system are arranged in order from the front of the vehicle body with an output shaft of the internal combustion engine aligned on the single axis and the single axis pointing in the longitudinal direction of the vehicle body, and the input shaft of the hybrid drive system is connected to the output shaft of the internal combustion engine and the output shaft of the hybrid drive system is operatively linked to the rear wheel.

10. The hybrid drive system according to claim 1, wherein a mount portion which can be mounted to a vehicle body is provided on a rear end portion of the case member.

11. A vehicle, comprising:
a vehicle body suspended by a front wheel and a rear wheel;
an internal combustion engine mounted to the vehicle body; and
the hybrid drive system according to claim 10 mounted to the vehicle body,
wherein the internal combustion engine and the hybrid drive system are arranged in order from the front of the vehicle body with an output shaft of the internal combustion engine aligned on the single axis and the single axis pointing in the longitudinal direction of the vehicle body, and
the input shaft of the hybrid drive system is connected to the output shaft of the internal combustion engine and the output shaft of the hybrid drive system is operatively linked to the rear wheel.

12. The hybrid drive system according to claim 1, wherein the first electric motor, the power distributing planetary gear, the speed change unit, and the second electric motor are arranged on the single axis in that order from the front end side.

13. The hybrid drive system according to claim 12, wherein the input shaft is rotatably supported by the two support portions, one of which supports one of the two end portions of the rotor of the first electric motor and the other of which supports the other of the two end portions of the rotor of the first electric motor; and the front end portion of the output shaft is rotatably supported via a bearing member by the partition part and the rear end portion of the output shaft is rotatably supported via a bearing member by the support portion part which supports a rear end portion of the rotor of the second electric motor.

14. A vehicle, comprising:
a vehicle body suspended by a front wheel and a rear wheel;
an internal combustion engine mounted to the vehicle body; and
the hybrid drive system according to claim 13 mounted to the vehicle body,
wherein the internal combustion engine and the hybrid drive system are arranged in order from the front of the vehicle body with an output shaft of the internal combustion engine aligned on the single axis and the single axis pointing in the longitudinal direction of the vehicle body, and
the input shaft of the hybrid drive system is connected to the output shaft of the internal combustion engine and the output shaft of the hybrid drive system is operatively linked to the rear wheel.

15. A vehicle, comprising:
a vehicle body suspended by a front wheel and a rear wheel;
an internal combustion engine mounted to the vehicle body; and
the hybrid drive system according to claim 12 mounted to the vehicle body,
wherein the internal combustion engine and the hybrid drive system are arranged in order from the front of the vehicle body with an output shaft of the internal combustion engine aligned on the single axis and the single axis pointing in the longitudinal direction of the vehicle body, and
the input shaft of the hybrid drive system is connected to the output shaft of the internal combustion engine and the output shaft of the hybrid drive system is operatively linked to the rear wheel.

16. The hybrid drive system according to claim 1, wherein the second electric motor, the speed change unit, the power distributing planetary gear, and the first electric motor are arranged on the single axis in that order from the front end side.

17. The hybrid drive system according to claim 16, wherein a front end portion of the input shaft is rotatably supported via a bearing member by the support portion part which supports the front end of the rotor of the second electric motor, and the rear end portion of the input shaft is rotatably supported via a bearing member by the partition part; and the output shaft is rotatably supported by the two support portions, one of which supports one end of the rotor of the first electric motor and the other of which supports the other end of the rotor of the first electric motor.

18. A vehicle, comprising:
a vehicle body suspended by a front wheel and a rear wheel;
an internal combustion engine mounted to the vehicle body; and
the hybrid drive system according to claim 17 mounted to the vehicle body,
wherein the internal combustion engine and the hybrid drive system are arranged in order from the front of the vehicle body with an output shaft of the internal combustion engine aligned on the single axis and the single axis pointing in the longitudinal direction of the vehicle body, and
the input shaft of the hybrid drive system is connected to the output shaft of the internal combustion engine and the output shaft of the hybrid drive system is operatively linked to the rear wheel.

19. A vehicle, comprising:
a vehicle body suspended by a front wheel and a rear wheel;
an internal combustion engine mounted to the vehicle body; and
the hybrid drive system according to claim 16 mounted to the vehicle body,
wherein the internal combustion engine and the hybrid drive system are arranged in order from the front of the vehicle body with an output shaft of the internal combustion engine aligned on the single axis and the single axis pointing in the longitudinal direction of the vehicle body, and
the input shaft of the hybrid drive system is connected to the output shaft of the internal combustion engine and the output shaft of the hybrid drive system is operatively linked to the rear wheel.

20. A vehicle, comprising:
a vehicle body suspended by a front wheel and a rear wheel;

an internal combustion engine mounted to the vehicle body; and the hybrid drive system according to claim 1 mounted to the vehicle body, wherein the internal combustion engine and the hybrid drive system are arranged in order from the front of the vehicle body with an output shaft of the internal combustion engine aligned on the single axis and the single axis pointing in the longitudinal direction of the vehicle body, and the input shaft of the hybrid drive system is connected to the output shaft of the internal combustion engine and the output shaft of the hybrid drive system is operatively linked to the rear wheel.

* * * * *

UNITED STATES PATENT AND TRADEMARK OFFICE
CERTIFICATE OF CORRECTION

PATENT NO. : 7,614,466 B2 Page 1 of 1
APPLICATION NO. : 11/249322
DATED : November 10, 2009
INVENTOR(S) : Kano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Nineteenth Day of October, 2010

David J. Kappos
*Director of the United States Patent and Trademark Office*